(12) United States Patent
Jin et al.

(10) Patent No.: US 12,411,541 B2
(45) Date of Patent: *Sep. 9, 2025

(54) DISPLAY DEVICE AND OPERATING METHOD THEREOF

(71) Applicant: SAMSUNG ELECTRONICS CO., LTD., Suwon-si (KR)

(72) Inventors: Suhwan Jin, Suwon-si (KR); Kunsok Kang, Suwon-si (KR); Daeyeon Yun, Suwon-si (KR); Seungil Yoon, Suwon-si (KR); Eungsik Yoon, Suwon-si (KR); Taedon Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/436,551

(22) Filed: Feb. 8, 2024

(65) Prior Publication Data
US 2024/0176410 A1 May 30, 2024

Related U.S. Application Data

(63) Continuation of application No. 17/833,125, filed on Jun. 6, 2022, now Pat. No. 11,928,252, which is a (Continued)

(30) Foreign Application Priority Data

Jan. 2, 2020 (KR) .................. 10-2020-0000453

(51) Int. Cl.
*G06F 3/01* (2006.01)
*G06F 3/041* (2006.01)

(52) U.S. Cl.
CPC .............. *G06F 3/011* (2013.01); *G06F 3/041* (2013.01)

(58) Field of Classification Search
CPC .. G06F 3/011; G06F 3/041; G06F 2200/1637; G06F 1/1626; G06F 1/1694;
(Continued)

(56) References Cited

U.S. PATENT DOCUMENTS 10,282,050 B2  5/2019  Lee et al.
10,866,731 B2  12/2020  Yang et al.
(Continued)

FOREIGN PATENT DOCUMENTS

CN   102422623 A   4/2012
CN   102638610 A   8/2012
(Continued)

OTHER PUBLICATIONS

Communication issued Feb. 24, 2021 by the European Patent Office in counterpart European Patent Application No. 20194412.1.
(Continued)

*Primary Examiner* — Matthew A Eason
*Assistant Examiner* — Chayce R Bibbee
(74) *Attorney, Agent, or Firm* — Sughrue Mion, PLLC

(57) ABSTRACT

An operating method of the display device includes detecting, through at least one sensor, at least one sensing value corresponding to the at least one sensor, identifying a touch area on the display device that is touched by a mobile device, based on the at least one sensing value, receiving status information about an operation that is being executed by the mobile device, from the mobile device, and performing a function corresponding to the identified touch area, based on the received status information.

16 Claims, 18 Drawing Sheets

Related U.S. Application Data continuation of application No. 17/014,553, filed on Sep. 8, 2020, now Pat. No. 11,360,547.

(58) Field of Classification Search
CPC ...... G06F 1/1698; G06F 1/1601; G06F 3/017; G06F 3/0412; G06F 3/04847; G06F 3/04883; G06F 3/147; G06F 3/0488; G06F 3/0484; G06F 3/1423; G06F 3/1454; H04M 1/72454; H04M 1/72412; H04M 1/72415; H04N 21/41407; H04N 21/422; H04N 21/43076; H04N 21/4316; H04N 21/442; H04W 4/80; A63F 13/25; A63F 13/31

See application file for complete search history.

(56) References Cited

U.S. PATENT DOCUMENTS

| | | | |
|---|---|---|---|
| 2006/0238517 A1* | 10/2006 | King | G06F 1/1637 |
| | | | 345/173 |
| 2008/0300985 A1 | 12/2008 | Shamp et al. | |
| 2011/0102350 A1 | 5/2011 | Jung | |
| 2012/0135687 A1 | 5/2012 | Thorn et al. | |
| 2012/0208514 A1* | 8/2012 | Park | H04W 4/023 |
| | | | 455/418 |
| 2014/0007211 A1 | 1/2014 | Yang et al. | |
| 2014/0057565 A1 | 2/2014 | Kim et al. | |
| 2014/0181739 A1* | 6/2014 | Yoo | G06F 3/04842 |
| | | | 715/800 |
| 2014/0223359 A1 | 8/2014 | Yamada | |
| 2017/0038898 A1 | 2/2017 | Kim et al. | |
| 2017/0075516 A1 | 3/2017 | Park et al. | |
| 2017/0192730 A1 | 7/2017 | Yang et al. | |
| 2024/0402876 A1 | 12/2024 | Yi et al. | |

FOREIGN PATENT DOCUMENTS

| | | | |
|---|---|---|---|
| CN | 103530032 | A | 1/2014 |
| CN | 105406923 | A | 3/2016 |
| CN | 106448558 | A | 2/2017 |
| CN | 106534475 | A | 3/2017 |
| CN | 110471639 | A | 11/2019 |
| EP | 2430820 | A1 | 3/2012 |
| EP | 2 490 421 | A1 | 8/2012 |
| JP | 2013130982 | A | 7/2013 |
| KR | 10-2012-0093744 | A | 8/2012 |
| KR | 10-2014-0001497 | A | 1/2014 |
| KR | 10-2014-0050464 | A | 4/2014 |
| KR | 10-2016-0019043 | A | 2/2016 |
| KR | 10-1594646 | B1 | 2/2016 |
| WO | 2010/131072 | A1 | 11/2010 |

OTHER PUBLICATIONS

International Search Report and Written Opinion issued Dec. 1, 2020 by the International Searching Authority in counterpart International Patent Application No. PCT/KR2019/011768 (PCT/ISA/210, PCT/ISA/220 and PCT/ISA/237).

Communication dated Feb. 14, 2023, issued by the European Patent Office in counterpart European Application No. 20194412.1.

Office Action dated Oct. 14, 2024, issued by Korean Patent Office in Korean Patent Application No. 10-2020-0000453.

Notice of Allowance dated Oct. 9, 2024, issued by European Patent Office in European Patent Application No. 20194412.1.

Office Action issued on Jan. 13, 2025 by the Chinese Patent Office in corresponding CN Patent Application No. 202011006731.9.

Office Action dated Jul. 26, 2025 issued by the Chinese Patent Office in Chinese Application No. 202011006731.9.

* cited by examiner

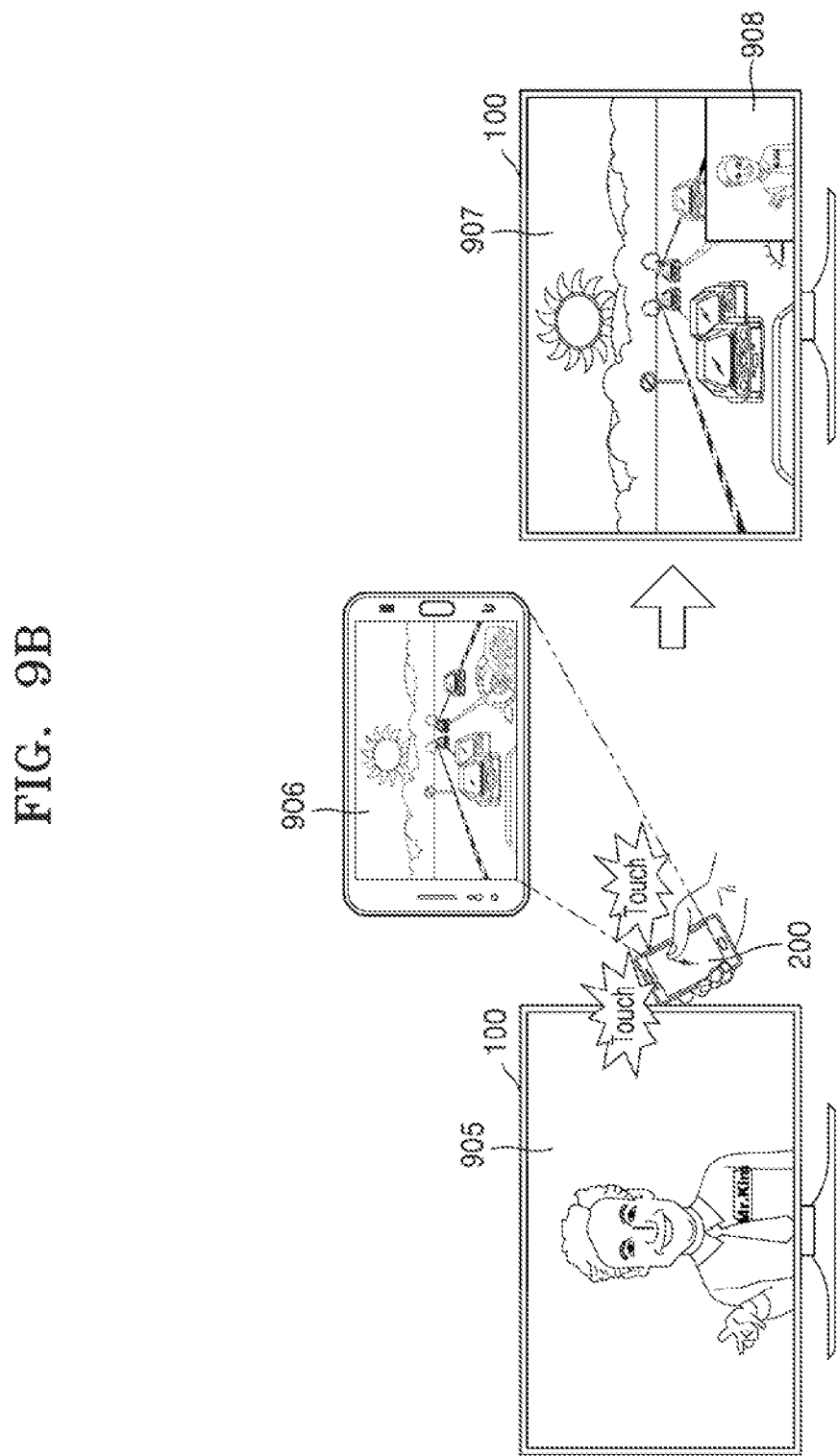

DISPLAY DEVICE AND OPERATING METHOD THEREOF

CROSS-REFERENCE TO RELATED APPLICATION(S)

This application is a Continuation Application of U.S. application Ser. No. 17/833,125 filed on Jun. 6, 2022, which is a Continuation Application of U.S. application Ser. No. 17/014,553, filed on Sep. 8, 2020, and issued as U.S. Pat. No. 11,360,547 on Jun. 14, 2022, which is based on and claims priority under 35 U.S.C. § 119 to Korean Patent Application No. 10-2020-0000453, filed on Jan. 2, 2020, in the Korean Intellectual Property Office, the disclosure of which is incorporated by reference herein in its entirety.

BACKGROUND

1. Field

The disclosure relates to display devices and operating methods thereof, and more particularly, to a display device which performs a function corresponding to a touch area when the display device is touched by a mobile device, and an operating method thereof.

2. Description of Related Art

The Internet of Things (IoT) refers to connecting all electronic devices, i.e., IoT devices, which exist in daily life, e.g., a television (TV), a smart phone, a personal computer (PC), a refrigerator, a washing machine, a wearable watch, and an automobile, via a wireless network. With the IoT, a plurality of electronic devices may be driven by exchanging data therebetween and processing the data.

With the development of IoT technology, there is an increasing need to connect IoT devices that provide various services and operate the IoT devices in connection with each other.

Mobile devices having portability might have a small display screen, while users may want to be provided with a service using a large-screen display device.

SUMMARY

Provided are a display device that performs a function corresponding to a touch area when the display device is touched by a mobile device, and an operating method thereof.

Additional aspects will be set forth in part in the description which follows and, in part, will be apparent from the description, or may be learned by practice of the presented embodiments.

According to an aspect of the disclosure, an operating method of a display device includes detecting at least one sensing value corresponding to at least one sensor through the at least one sensor, identifying a touch area on the display device touched by a mobile device, based on the at least one sensing value, receiving status information about an operation that is being executed by the mobile device from the mobile device through a communicator, and performing a preset function corresponding to the identified touch area, based on the received status information.

According to an aspect of the disclosure, a display device includes a communicator, a sensing unit including at least one sensor, a memory storing one or more instructions, and a processor configured to execute the one or more instructions stored in the memory, wherein the processor is configured to execute the one or more instructions to: detect at least one sensing value corresponding to the at least one sensor through the at least one sensor; identify a touch area on the display device touched by a mobile device, based on the at least one sensing value; receive status information about an operation that is being executed by the mobile device from the mobile device through the communicator; and perform a preset function corresponding to the identified touch area, based on the received status information.

According to an aspect of the disclosure, a non-transitory computer-readable recording medium storing a program for executing the operating method in a computer is provided.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9B is a diagram illustrating an example of performing a function corresponding to the number of touches, according to an embodiment;

DETAILED DESCRIPTION

Figure 1:
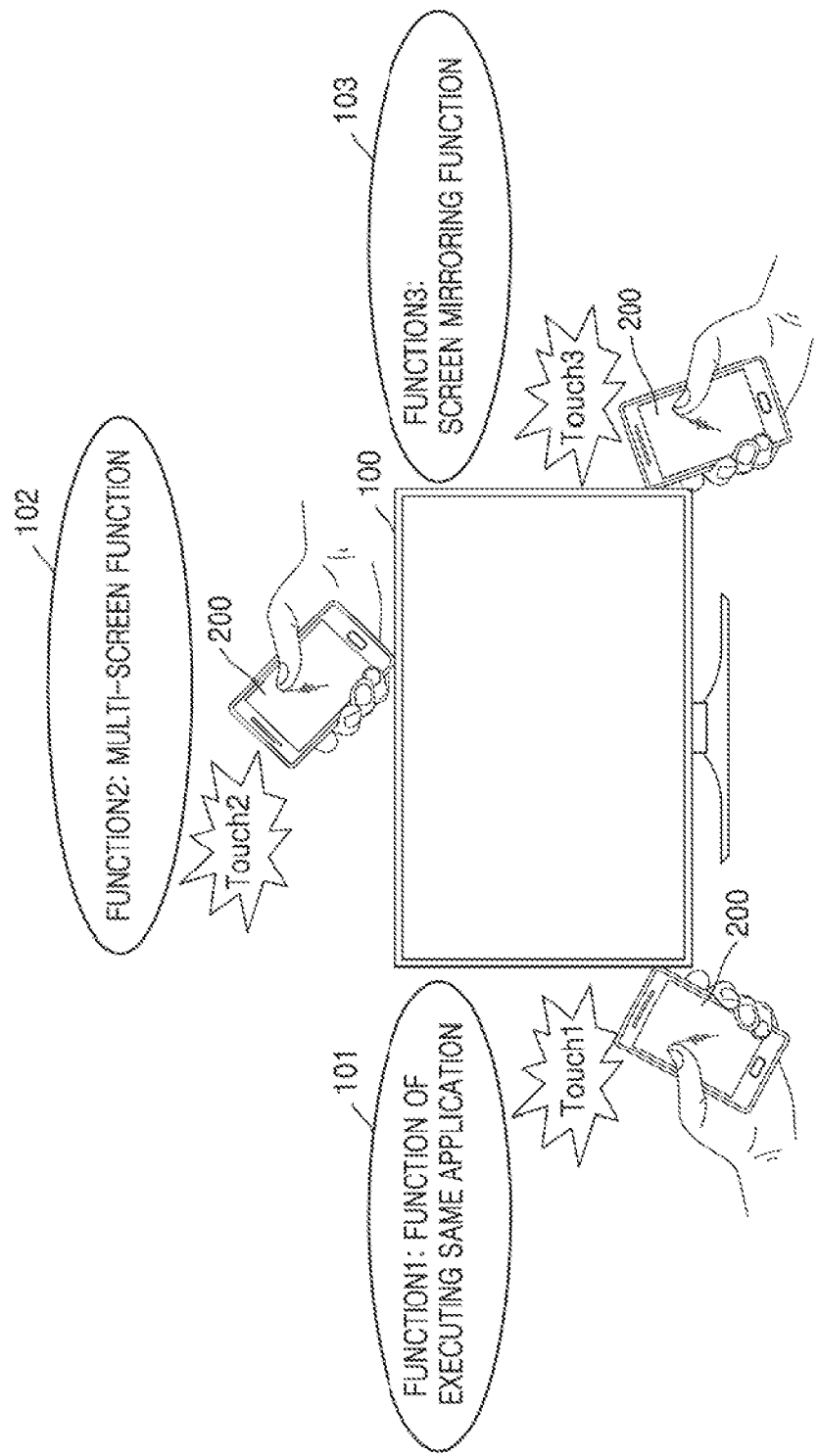
FIG. 1 is a diagram schematically illustrating an example in which a display device according to an embodiment is operated.

Certain embodiments will be described with reference to the accompanying drawings. However, the present disclosure may be embodied in many different forms and is not limited to the embodiments set forth herein. For clarity, parts not related to embodiments are omitted in the drawings, and like components are denoted by like reference numerals throughout the specification.

In embodiments, general terms that have been widely used nowadays are selected in consideration of functions mentioned herein but various other terms may be used according to the intentions of those skilled in the art, precedents, new technologies, or the like. Accordingly, the terms used herein should be defined not based on the names thereof but based on the meanings thereof and the entire context of embodiments.

As used herein, the expression "at least one of a, b or c" indicates only a, only b, only c, both a and b, both a and c, both b and c, all of a, b, and c, or variations thereof.

As used herein, the terms "1st" or "first" and "2nd" or "second" may use corresponding components regardless of importance or order and are used to distinguish one component from another without limiting the components.

The terms used herein are only used to describe certain embodiments and are not limiting. As used herein, the singular expressions are intended to include plural forms as well, unless the context clearly dictates otherwise. As used herein, when an element is referred to as being "connected" to another element, it should be understood to mean that the element is "directly connected" to the other element or is "electrically connected" to the other element while having another element therebetween. It will be understood that when an element is referred to as "including" another element, the element may further include other elements unless mentioned otherwise.

As used herein, and particularly, in the claims, the term "the" and demonstratives similar thereto may indicate both a singular form and a plural form. Operations of methods according to embodiments may be performed in an appropriate order unless explicitly stated otherwise. Embodiments are not limited by the order in which the operations are performed.

As used herein, expressions such as "in some embodiments" or "in an embodiment" do not necessarily refer to the same embodiment.

Some embodiments may be represented by functional block configurations and various operations. Some or all of these functional blocks may be implemented by various numbers of hardware and/or software configurations for performing particular functions. For example, functional blocks may be implemented by one or more microprocessors or by circuit configurations for certain functions. For example, the functional blocks as set forth herein may be implemented in various programming or scripting languages. The functional blocks may be implemented with an algorithm executed by one or more processors. Related art may be employed for electronic configuration, signal processing, and/or data processing. Terms such as "mechanism", "element", "means" and "configuration" can be used broadly and are not limited to mechanical and physical configurations.

In the drawings, lines or members for connection between components are merely illustrative of functional connections and/or physical or circuit connections. The connections between components of a device may be represented by various functional connections, physical connections, or circuit connections that are replaceable or added.

Embodiments will now be described in detail with reference to the accompanying drawings.

FIG. 1 is a diagram schematically illustrating an example in which a display device according to an embodiment is operated.

Referring to FIG. 1, a display device 100 (e.g., a TV) may perform a function related to a mobile device 200 (e.g., a smart phone) when an area on the display device 100 is touched by the mobile device 200.

In an embodiment, the display device 100 may perform a preset function corresponding to a touch area touched by the mobile device 200. For example, the display device 100 may perform a preset function corresponding to each touch area on the display device 100 related to an operation that is being executed by the mobile device 200, e.g., a function of executing an application that is the same as application that is being executed by the mobile device 200 (a first function 101), a multi-screen function (a second function 102), or a screen mirroring function (a third function 103).

Referring to FIG. 1, for example, the display device 100 is set to perform the first function 101 when touching of a left bezel area thereof is sensed, perform the second function 102 when touching of an upper bezel area thereof is sensed, and perform the third function 103 when touching of a right bezel area thereof is sensed.

In an embodiment, pairing may be performed between the display device 100 and the mobile device 200 simply by touching an area on the display device 100 by the mobile device 200 without a separate complicated entry process, and the display device 100 may subsequently perform a function related to an operation that is being executed in the mobile device 200.

Accordingly, a user of the mobile device 200 having a small display (e.g., a smart phone) is able to be provided seamlessly with a service, which is being performed by the mobile device 200, through the display device 100 having a large display (e.g., a TV).

In an embodiment, a user may directly set a desired function to be performed or change the desired function by touching an area which is convenient to use among, for example, four bezel areas of the display device 100, in consideration of a location at which the display device 100 is installed. Accordingly, a convenient user-customized user interface environment may be implemented.

In an embodiment, a case in which a bezel area of the display device 100 is touched by the mobile device 200 is described as an example but embodiments are not limited thereto. A touch area may be at least an area on the display device 100.

In an embodiment, the display device 100 may be an electronic device including a display, e.g., a TV. The display device 100 may be embodied in various forms, such as a desktop, a laptop computer, a tablet personal computer (PC), a mobile phone, an e-book terminal, a digital broadcasting terminal, a personal digital assistant (PDA), a portable multimedia player (PMP), a digital camera, a camcorder, a navigation device, an MP3 players, a wearable device, and the like. Alternatively, the display device 100 may be a fixed electronic device arranged at a fixed position or a mobile electronic device having a portable form or may be a digital broadcast receiver capable of receiving digital broadcasting services.

In particular, embodiments may be easily implemented by the display device 100 which is a large-sized display such as a TV but are not limited thereto.

In an embodiment, the mobile device 200 may include, but is not limited to, a mobile computing device such as a smart phone, a wearable device, a tablet PC, a PDA, a laptop computer, a media player, a micro-server, and a global positioning system (GPS) device.

In an embodiment, the display device 100 and the mobile device 200 may transmit data to and receive data from each other through a communication network. For example, the display device 100 may be connected to or paired with the mobile device 200.

In an embodiment, the communication network may be configured as at least one of a wired communication network or a wireless communication network. In detail, mobile communication (e.g., wireless broadband (Wibro), world interoperability for microwave access (Wimax), code division multiple access (CDMA), wideband CDMA (WCDMA), $3^{rd}$ generation (3G), 4G, or 5G), a short-range communication (e.g., near field communication (NFC), Bluetooth, wireless local area network (WLAN), or Wi-Fi), and/or low-power long-distance communication (e.g., TV white space (TVWS) or weightless) may be used as the communication network used to implement the IoT.

FIG. 1 is an example only and embodiments are not limited thereto.

Figure 14:
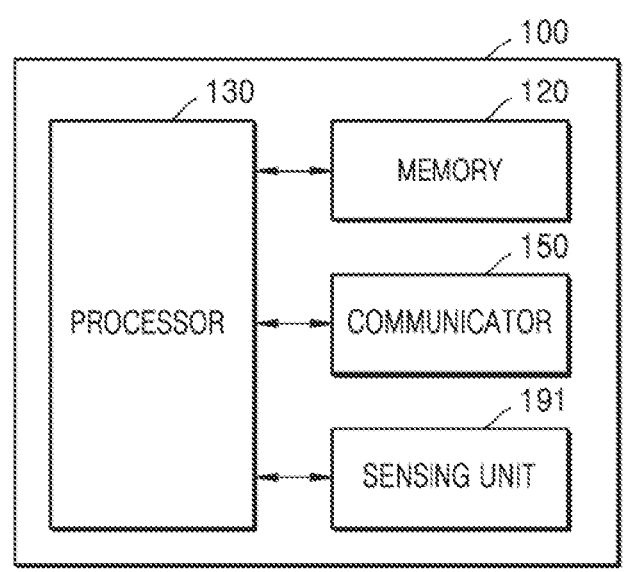
FIG. 14 is a block diagram of a display device according to an embodiment.
Figure 15:
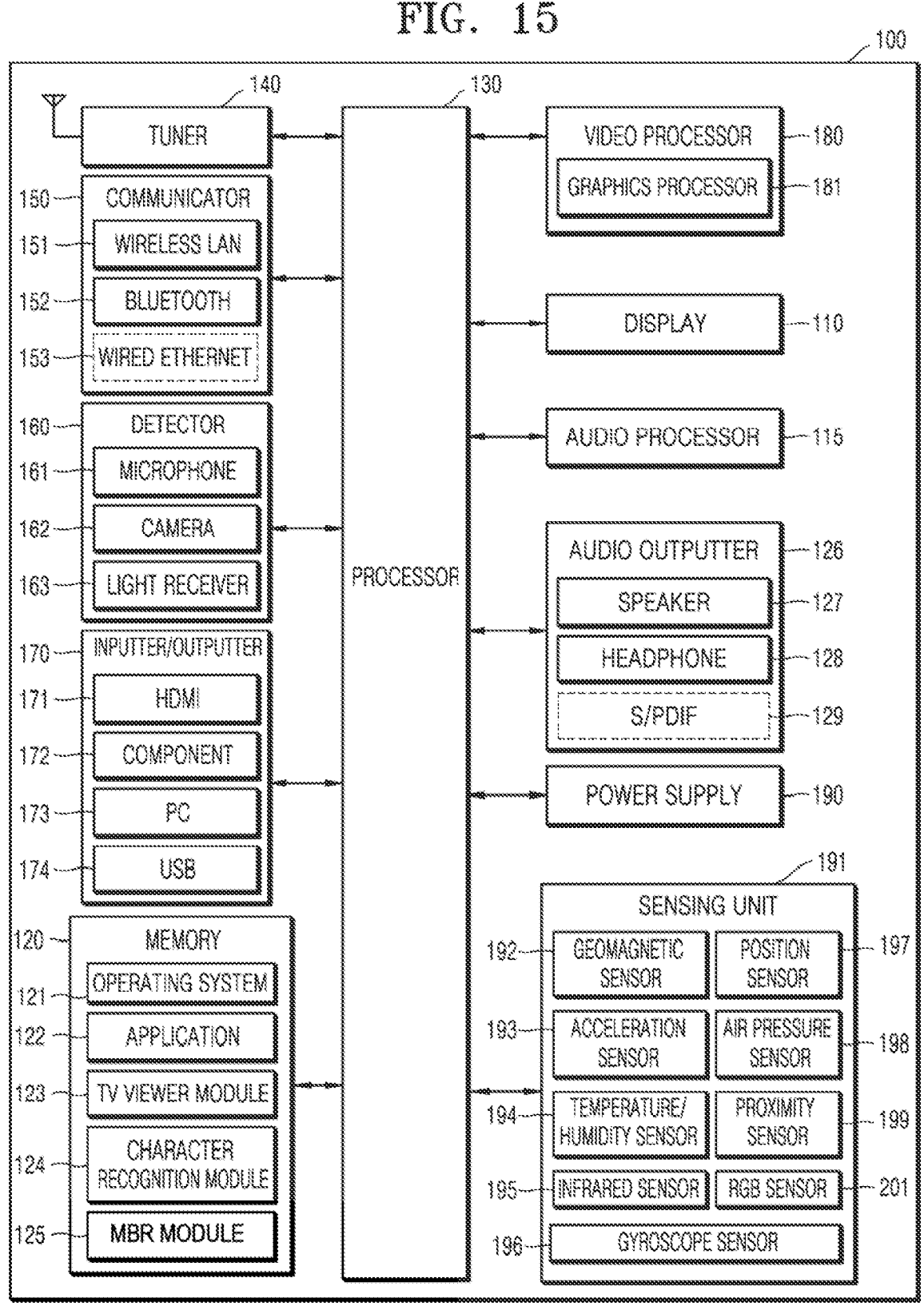
FIG. 15 is a detailed block diagram of a display device according to an embodiment.
Figure 16:
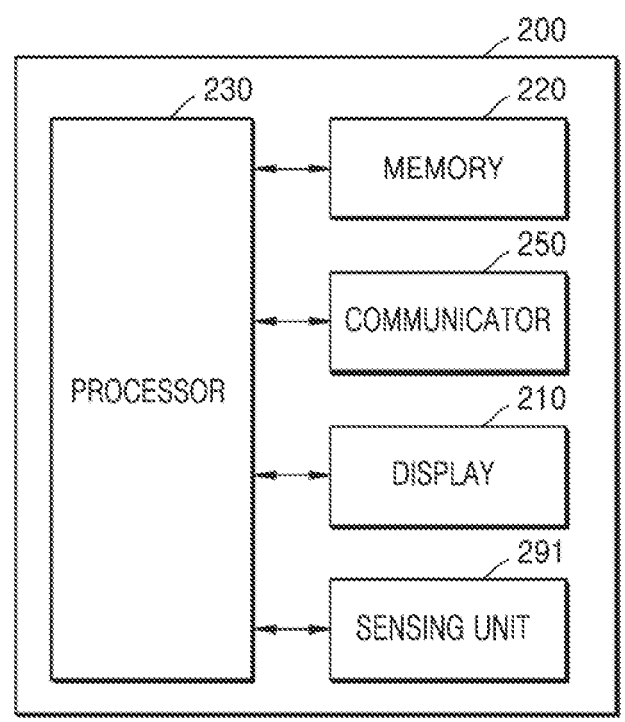
FIG. 16 is a block diagram of a mobile device according to an embodiment.

FIG. 14 is a block diagram of a display device according to an embodiment. FIG. 15 is a detailed block diagram of a display device according to an embodiment. FIG. 16 is a block diagram of a mobile device according to an embodiment.

As illustrated in FIG. 14, a display device 100 according to an embodiment may include a memory 120, a processor 130, a communicator 150, e.g., a communication circuit or a communication interface, and a sensing unit 191. However, not all of the illustrated components are essential components. The display device 100 may include more or fewer components than the illustrated components.

For example, as illustrated in FIG. 15, the display device 100 according to an embodiment may further include the display 110, a tuner or tuners 140, a detector 160, an inputter/outputter 170, a video processor 180, an audio processor 115, an audio outputter 126, and a power supply 190.

The processor 130 controls overall operations of the display device 100 and a signal flow between the internal components of the display device 100, and performs a data processing function. The processor 130 may execute an operation system (OS) and various applications stored in the memory 120 when there is a user input or a preset and stored condition is satisfied.

The processor 130 may include a random access memory (RAM) which stores a signal or data input from the outside of the display device 100 or is used as a storage region corresponding to various operations performed by the display device 100, and a read-only memory (ROM) which stores a control program for control of the display device 100.

The processor 130 may include a graphics processing unit (GPU) to process graphics corresponding to video. The processor 130 may be embodied as a System-on-Chip (SoC) which is a combination of a core and a GPU. The processor 130 may include a single core, dual cores, triple cores, quad cores, or multiple cores.

Alternatively, the processor 130 may include a plurality of processors. For example, the processor 130 may be embodied as including a main processor and a sub-processor that operates in a sleep mode.

In an embodiment, the processor 130 may execute at least one instruction stored in the memory 120 to detect at least one sensing value corresponding to at least one sensor through the sensing unit 191 which includes the at least one sensor.

In an embodiment, the processor 130 may execute one or more instructions stored in the memory 120 to determine that the display device 100 is touched by the mobile device 200 when it is determined that a detected at least one sensing value is equal to or greater than a preset threshold.

In an embodiment, the processor 130 may execute one or more instructions stored in the memory 120 to compare a detected at least one sensing value with a sensing value of the mobile device 200 received from the mobile device 200 so as to determine whether the display device 100 is touched by the mobile device 200.

In an embodiment, the processor 130 may execute one or more instructions stored in the memory 120 to request identification information of the mobile device 200 and receive the identification information of the mobile device 200. The processor 130 may identify whether the mobile device 200 is a device previously registered with the display device 100, based on the identification information of the mobile device 200.

In an embodiment, the processor 130 may execute one or more instructions stored in the memory 120 to identify a touch area on the display device 100 touched by the mobile device 200, based on at least one sensing value.

In an embodiment, the processor 130 may execute one or more instructions stored in the memory 120 to compare at least one sensing value detected to correspond to at least one sensor and identify at least one sensor located close to a point on the display device 100 touched by the mobile device 200, based on a result of the comparison. In addition, the processor 130 may identify a touch area, based on the identified one or more sensors.

In an embodiment, the processor 130 may receive status information about an operation that is being executed by the mobile device 200 from the mobile device 200 through the communicator 150.

In an embodiment, the processor 130 may execute one or more instructions stored in the memory 120 to perform a preset function corresponding to the identified touch area, based on the received status information of the mobile device 200.

In an embodiment, the processor 130 may execute one or more instructions stored in the memory 120 to identify the number of times the display device 100 is touched by the mobile device 200, based on at least one sensing value.

In an embodiment, the processor 130 may execute one or more instructions stored in the memory 120 to perform a preset function corresponding to the number of times the display device 100 is touched.

In an embodiment, the processor 130 may execute one or more instructions stored in the memory 120 to set in advance a function corresponding to at least one touch area on the display device 100, based on a user input.

In addition, the processor 130 may execute one or more instructions stored in the memory 120 to set in advance a function corresponding to the number of times at least one touch area is touched on the display device 100, based on a user input.

The memory 120 may store various data, programs, or applications for driving and controlling the display device 100 under control of the processor 130. The memory 120 may store signals or data input/output to correspond to driving of the video processor 180, the display 110, the audio processor 115, the audio outputter 126, the power supply 190, the tuner 140, the communicator 150, the detector 160, and the inputter/outputter 170.

The memory 120 may store an operating system 121 for control of the display device 100 and the processor 130, an application 122 initially provided from the manufacturer or downloaded from the outside, a graphical user interface (GUI) related to applications, objects (e.g., images, text, icons, buttons, etc.) for providing the GUI, user information, documents, databases, or related data.

The memory 120 may further include a TV viewer module 123 storing one or more instructions to receive an input signal from a remote control device and perform channel control corresponding to the input signal or to enter a channel scroll user interface mode when an input signal corresponds to a pre-assigned input, a character recognition module 124 storing one or more instructions to recognize information from content received from an external device, and a memory buffer register (MBR) module 125 storing one or more instructions for channel control from an external device.

For example, software (e.g., the program) containing one or more instructions may be stored in a machine-readable (e.g., computer-readable) storage medium (e.g., internal memory) or external memory.

The memory 120 includes a ROM, a RAM, or a memory card (e.g., a micro SD card or a USB memory) mounted in the display device 100. Alternatively, the memory 120 may include a non-volatile memory, a volatile memory, a hard disk drive (HDD), or a solid-state drive (SSD).

In an embodiment, the memory 120 may include at least one type storage medium among a flash memory type storage medium, a hard disk type storage medium, a multimedia card micro type storage medium, a card type memory (e.g., SD or XD memory), a RAM, a static RAM (SRAM), a ROM, an electrically erasable programmable ROM (EEPROM), a PROM, a magnetic memory, a magnetic disk, and an optical disk.

The display 110 displays on a screen a video included in a broadcast signal received via the tuner 140, under control of the processor 130. The display 110 may display content (e.g., a moving image) input via the communicator 150 or the inputter/outputter 170. The display 110 may output an image stored in the memory 120 under control of the processor 130.

The display 110 generates a driving signal by converting an image signal, a data signal, an on-screen display (OSD) signal, a control signal or the like processed by the processor 130. The display 110 may be embodied as a plasma display panel (PDP), a liquid crystal display (LCD), an organic light-emitting diode (OLED), a cathode ray tube (CRT), a flexible display, or the like or may be embodied as a three-dimensional (3D) display. Alternatively, the display 110 may be configured as a touch screen to be used as an input device and an output device.

The tuner 140 may select only a frequency of a channel to be received by the display device 100 among various radio wave components by tuning only the frequency of the channel by performing amplification, mixing, or resonance on a broadcast signal received via wire or wirelessly. The broadcast signal includes audio data, video and additional information (e.g., an electronic program guide (EPG)).

The tuner 140 may receive a broadcast signal in a frequency band corresponding to a channel number according to a user input (e.g., a control signal received from a remote control device, for example, a channel number input, a channel up-down input, and a channel input in an EPG screen).

The tuner 140 may receive a broadcast signal from various sources such as terrestrial broadcasting, cable broadcasting, satellite broadcasting, Internet broadcasting, and the like. The tuner 140 may receive a broadcast signal from a source such as analog broadcasting or digital broadcasting. Decoding (e.g., audio decoding, video decoding, or supplementary information decoding) is performed on the broadcast signal received via the tuner 140 to divide the broadcast signal into audio data, video and/or additional information. The audio data, the video and/or the additional information may be stored in the memory 120 under control of the processor 130.

The display device 100 may include one or more tuners 140. The tuner 140 may be embodied as either an all-in-one device including the display device 100, a separate device (e.g., a set-top box which includes a tuner electrically connected to the display device 100), or a tuner connected to the inputter/outputter 170.

The communicator 150 may connect the display device 100 to an external device (e.g., an audio device) under control of the processor 130. The processor 130 may transmit content to or receive content from an external device connected thereto via the communicator 150, download an application from the external device, or perform web browsing. The communicator 150 may include one of a wireless LAN 151, a Bluetooth module 152, and a wired Ethernet module 153 to correspond to the performance and structure of the display device 100. Alternatively, the communicator 150 may include a combination of the wireless LAN 151, the Bluetooth module 152, and the wired Ethernet module 153.

The communicator 150 may receive a control signal from a remote control device under control of the processor 130. The control signal may be embodied as a Bluetooth type, an RF signal type, or a Wi-Fi type.

The communicator 150 may further include a short-range communication module (e.g., an NFC module) or a Bluetooth Low Energy (BLE) module, in addition to the Bluetooth module 152.

The detector 160 may sense a user's voice, video, or interaction, and include a microphone 161, a camera or cameras 162, and a light receiver 163.

The microphone 161 receives the user's uttered voice. The microphone 161 may convert received voice into an electric signal and output the electric signal to the processor 130. The user's voice may include, for example, voice corresponding to a menu or function of the display device 100.

The camera 162 may obtain an image frame such as a still image or a video. An image obtained by an image sensor may be processed through the processor 130 or a separate image processor.

An image frame processed by the camera 162 may be stored in the memory 120 or transmitted to the outside via the communicator 150. Two or more cameras 162 may be provided according to a configuration of the display device 100.

The light receiver 163 receives an optical signal (including a control signal) from an external remote control device. The light receiver 163 may receive an optical signal corresponding to a user input (e.g., touching, pressing, a touch gesture, voice, or a motion) from a remote control device.

The control signal may be extracted from the received optical signal under control of the processor 130. For example, the light receiver 163 may receive a control signal corresponding to a channel up/down button for channel switching from a remote control device.

The inputter/outputter 170 receives a video (e.g., a moving picture), an audio signal (e.g., voice or music), and additional information (e.g., an EPG) from the outside of the display device 100, under control of the processor 130. The inputter/outputter 170 may include at least one of a high-definition multimedia interface (HDMI) port 171, a component jack 172, a PC port 173, or a USB port 174. The inputter/outputter 170 may include at least one combination of the HDMI port 171, the component jack 172, the PC port 173, or the USB port 174. An external image providing device may be connected through the HDMI port 171.

The video processor 180 processes video data received by the display device 100. The video processor 180 may perform various image processing, such as decoding, scaling, noise filtering, frame rate conversion, and resolution conversion, on the video data.

A graphics processor 181 generates a screen including various objects, such as an icon, an image, and text, using an operation unit and a renderer. The operation unit calculates attribute values, such as coordinates, a shape, a size, and color, of each object to be displayed according to a layout of the screen by using a user input sensed by the detector 160. The renderer generates screens of various layouts including objects, based on the attribute values calculated by the operation unit. The screen generated by the renderer is displayed on a display area of the display 110.

The audio processor 115 processes audio data. The audio processor 115 may perform various operations, such as decoding, amplification, and noise filtering, on the audio data. The audio processor 115 may include a plurality of audio processing modules to process audio data corresponding to a plurality of pieces of content.

The audio outputter 126 outputs audio data included in a broadcast signal received via the tuner 140 under control of the processor 130. The audio outputter 126 may output audio data (e.g., voice or sound) input via the communicator 150 or the inputter/outputter 170. The audio outputter 126 may output audio data stored in the memory 120 under control of the processor 130. The audio outputter 126 may include at least one of a speaker 127, a headphone output terminal 128, or a Sony/Philips Digital Interface (S/PDIF) output terminal 129. The audio outputter 126 may include a combination of the speaker 127, the headphone output terminal 128 and the S/PDIF output terminal 129.

The power supply 190 supplies power from an external power source to the internal components of the display device 100 under control of the processor 130. Alternatively, the power supply 190 supplies power output from one or more batteries included in the display device 100 to the internal components under control of the processor 130.

The sensing unit 191 may sense a status of the display device 100 or a status of surroundings of the display device 100 and transmit sensed information to the processor 130.

The sensing unit 191 may include at least one of, but is not limited to, a geomagnetic sensor 192, an acceleration sensor 193, a temperature/humidity sensor 194, an infrared sensor 195, a gyroscope sensor 196, a position sensor (e.g., a GPS) 197, an air pressure sensor 198, a proximity sensor 199, or an RGB sensor (illuminance sensor) 201. A function of each of these sensors is intuitively inferable by those of ordinary skill in the art from the name thereof and thus a detailed description thereof will be omitted here.

In an embodiment, the sensing unit 191 may sense an external impact applied to the display device 100. For example, as the display device 100 is touched by the mobile device 200, the sensing unit 191 of the display device 100 may output a sensing value.

The display device 100 including the display 110 may be electrically connected to a separate external device (e.g., a set-top box) including the tuner 140.

The display device 100 may be embodied as, but is not limited to, an analog TV, a digital TV, a 3D-TV, a smart TV, an LED TV, an OLED TV, a plasma TV, a monitor, or the like.

The block diagram of the illustrated display device 100 is a block diagram according to an embodiment. The components of the block diagram may be combined together or omitted or new components may be added thereto according to the specifications of the display device 100 that is actually implemented. That is, two or more components may be combined into one component or one component may be divided into two or more components as needed. A function performed in each block is only provided to explain embodiments and the scope of the disclosure should not be construed as being limited to a specific operation or device therefor.

With reference to FIG. 16, a mobile device 200 according to an embodiment may include at least some of the components illustrated in FIGS. 14 and 15.

As illustrated in FIG. 16, the mobile device 200 according to an embodiment may include a display 210, a memory 220, a communicator 250, e.g., a communication circuit or a communication interface, a sensing unit 291, and a processor 230. However, not all of the components illustrated in FIG. 16 are indispensable components of the mobile device 200. The mobile device 200 may include more or fewer components than the components illustrated in FIG. 16.

In an embodiment, the display 210 of the mobile device 200 generates a driving signal by converting an image signal, a data signal, an OSD signal, a control signal or the like processed by the processor 230.

The display 210 may display content (e.g., a moving image) input via the communicator 250 or an inputter/outputter. The display 210 may output an image stored in the memory 220 under control of the processor 230.

In an embodiment, the memory 220 of the mobile device 200 may store a program for processing and control by the processor 230, and store data input to or output from the mobile device 200.

In an embodiment, generally, the processor 230 controls overall operations of the mobile device 200. For example, the processor 230 may execute programs stored in the memory 220 to control overall operations of the sensing unit 291, the communicator 250, and the like. The processor 230 may control operations of the mobile device 200 to perform the functions of the mobile device 200 described above with reference to embodiments described herein.

The processor 230 may include one or more processors. In this case, the one or more processors may be a general-purpose processor such as a central processing unit (CPU), an application processor (AP), or a digital signal processor (DSP), or a graphic-dedicated processor such as a GPU or a vision processing unit (VPU). The one or more processors control input data to be processed according to predefined operation rules stored in the memory 220.

In an embodiment, the processor 230 may receive a radio signal transmitted from the display device 100 through the communicator 250.

In addition, the processor 230 may receive a request to transmit identification information of the mobile device 200 from the display device 100 through the communicator 250. The processor 230 may control the communicator 250 to transmit the identification information of the mobile device 200 to the display device 100.

The processor 230 may control the communicator 250 to transmit a sensing value detected by the sensing unit 291 to the display device 100.

The processor 230 may receive a request to transmit status information about an operation, which is being executed by the mobile device 200, through the communicator 250. The processor 230 may generate status information about the operation that is being executed. In addition, the processor 230 may control the communicator 250 to transmit the status information about the operation, which is being executed, to the display device 100.

The memory 220 may include at least one type storage medium among a flash memory type storage medium, a hard disk type storage medium, a multimedia card micro type storage medium, a card type memory (e.g., SD or XD memory), a RAM, a static RAM (SRAM), a ROM, an EEPROM, a PROM, a magnetic memory, a magnetic disk, and an optical disk.

In an embodiment, the communicator 250 may include one or more components enabling the mobile device 200 to communicate with the outside, e.g., with one or more external devices. For example, the communicator 250 may include a short-range communicator, a mobile communicator, and a broadcast receiver.

The short-range wireless communicator may include, but is not limited to, a Bluetooth communicator, BLE communicator, a near-field communicator, a WLAN (or Wi-Fi) communicator, a Zigbee communicator, an infrared data association (IrDA) communicator, a Wi-Fi Direct (WFD) communicator, an ultra-wideband (UWB) communicator, an Ant+ communicator, or the like.

The mobile communicator transmits a radio signal to and receives a radio signal from at least one of a base station, an external terminal, or a server in a mobile communication network. Here, the radio signal may include a voice call signal, a video call signal, or various types of data generated due to the transmission and reception of text/multimedia messages.

The broadcast receiver receives a broadcast signal and/or broadcast-related information from the outside through a broadcast channel. The broadcast channel may include a satellite channel and a terrestrial channel. In an embodiment, the broadcast receiver may be omitted.

The sensing unit 291 may sense a status of the mobile device 200 or a status of surroundings of the mobile device 200 and transmit sensed information to the processor 230.

The sensing unit 291 may include at least one of, but is not limited to, a geomagnetic sensor, an acceleration sensor, a temperature/humidity sensor, an infrared sensor, a gyroscope sensor, a position sensor (e.g., a GPS), an illuminance sensor or an optical sensor, a proximity sensor, or an RGB sensor. A function of each of these sensors is intuitively inferable by those of ordinary skill in the art from the name thereof and thus a detailed description thereof will be omitted here.

In an embodiment, the sensing unit 191 may sense an external impact applied to the mobile device 200. In an embodiment, an acceleration sensor included in the mobile device 200 may sense an impact caused when the display device 100 is touched by the mobile device 200. In addition, the acceleration sensor included in the mobile device 200 may sense a moving speed and acceleration of the mobile device 200.

The above descriptions of the display 110, the memory 120, the communicator 150, the sensing unit 191, and the processor 130 of the display device 100 with reference to FIGS. 14 and 15 are applicable to the display 210, the memory 220, the communicator 250, the sensing unit 291, and the processor 230 of the mobile device 200.

Figure 2:
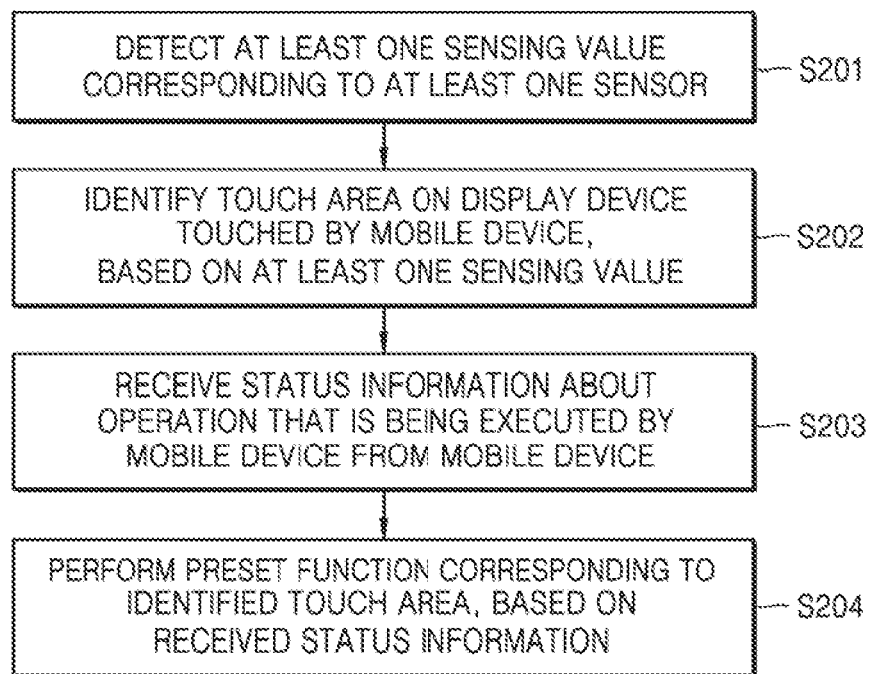
FIG. 2 is a flowchart of an operating method of a display device, according to an embodiment.

FIG. 2 is a flowchart of an operating method of a display device, according to an embodiment.

In operation S201 of FIG. 2, the display device 100 according to an embodiment may detect at least one sensing value corresponding to at least one sensor.

For example, when an area on the display device 100 is touched by the mobile device 200, the display device 100 may detect a sensing value sensed by at least one sensor included in a sensing unit 191 mounted thereon.

In an embodiment, the display device 100 may include the sensing unit 191 which includes at least one sensor. The at least one sensor may be a sensor capable of sensing a physical impact on the exterior (e.g., a bezel) of the display device 100. The at least one sensor may include an acceleration sensor 193. For example, the at least one sensor may include a 6-axis sensor and/or a 9-axis sensor but is not limited thereto.

In an embodiment, the at least one sensor may be mounted in a bezel area of the display device 100. For example, the at least one sensor may be arranged at a location on all bezel areas of the display device 100, at which an external impact applied on the display device 100 is more easily detected. For example, when a plurality of sensors are mounted, the plurality of sensors may be arranged so that the distance between each sensor may be maximized as possible.

Figure 11A:
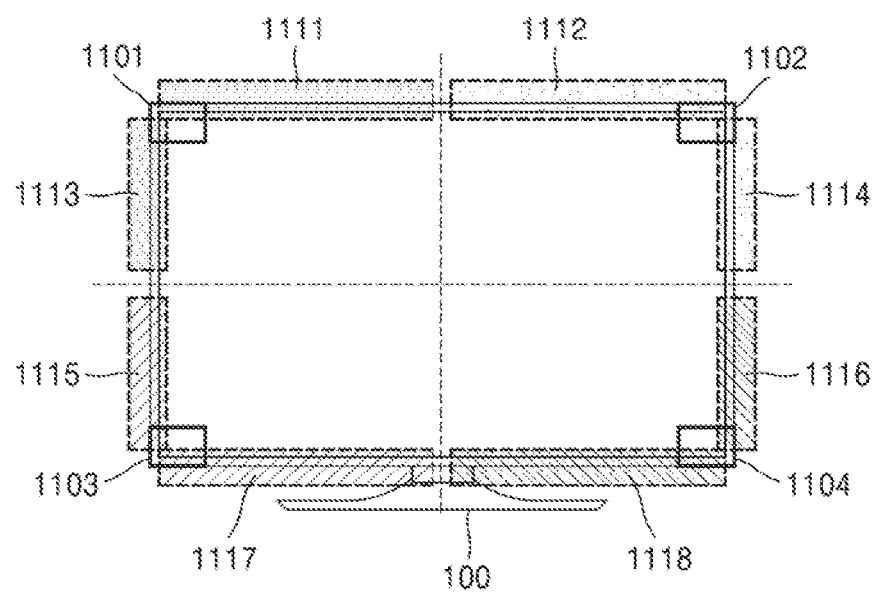
FIG. 11A is a diagram illustrating an example in which at least one sensor is arranged on a display device and an example of a touch area, according to an embodiment.

For example, four sensors may be disposed close to corner areas of the bezel areas of the display device 100 (see FIG. 11A). The number and positions of sensors mounted on the display device 100 are not limited thereto.

In operation S202 of FIG. 2, the display device 100 according to an embodiment may identify a touch area which is touched by the mobile device 200, based on the at least one sensing value.

In an embodiment, the display device 100 may identify an area thereof on which a physical impact is applied, i.e., a touch area touched by the mobile device 200, based on a position of a sensor which detects a relatively large sensing value.

For example, when a sensing value is sensed due to a physical impact, for example, by a first sensor 1101 (see FIG. 11A), the display device 100 may identify an area close to a position of the first sensor 1101 as a touch area touched by the mobile device 200.

In operation S203 of FIG. 2, the display device 100 according to an embodiment may receive status information about an operation that is being executed by the mobile device 200 from the mobile device 200.

In an embodiment, the mobile device 200 may transmit the status information about the operation that is being executed thereby to the display device 100, in response to a request signal from the display device 100.

In an embodiment, the status information about the operation that is being executed by the mobile device 200 may include information about an application that is being executed in the mobile device 200. Alternatively, the status information may include information about a screen that is being displayed on the mobile device 200.

For example, the information about the application may include, but is not limited to, at least one of the type of the application, download information of the application, or content information related to execution of the application.

In operation S204 of FIG. 2, the display device 100 according to an embodiment may perform a preset function corresponding to the identified touch area, based on the received status information.

In an embodiment, the display device 100 may perform the preset function corresponding to the identified touch area, based on the information about the screen that is being displayed on the mobile device 200. For example, when the preset function corresponding to the identified touch area is the screen mirroring function, the display device 100 may display an application execution screen, which is being displayed on the mobile device 200, on a display 110 of the display device 100.

FIGS. 1 and 2 are examples only and embodiments are not limited thereto.

Figure 3:
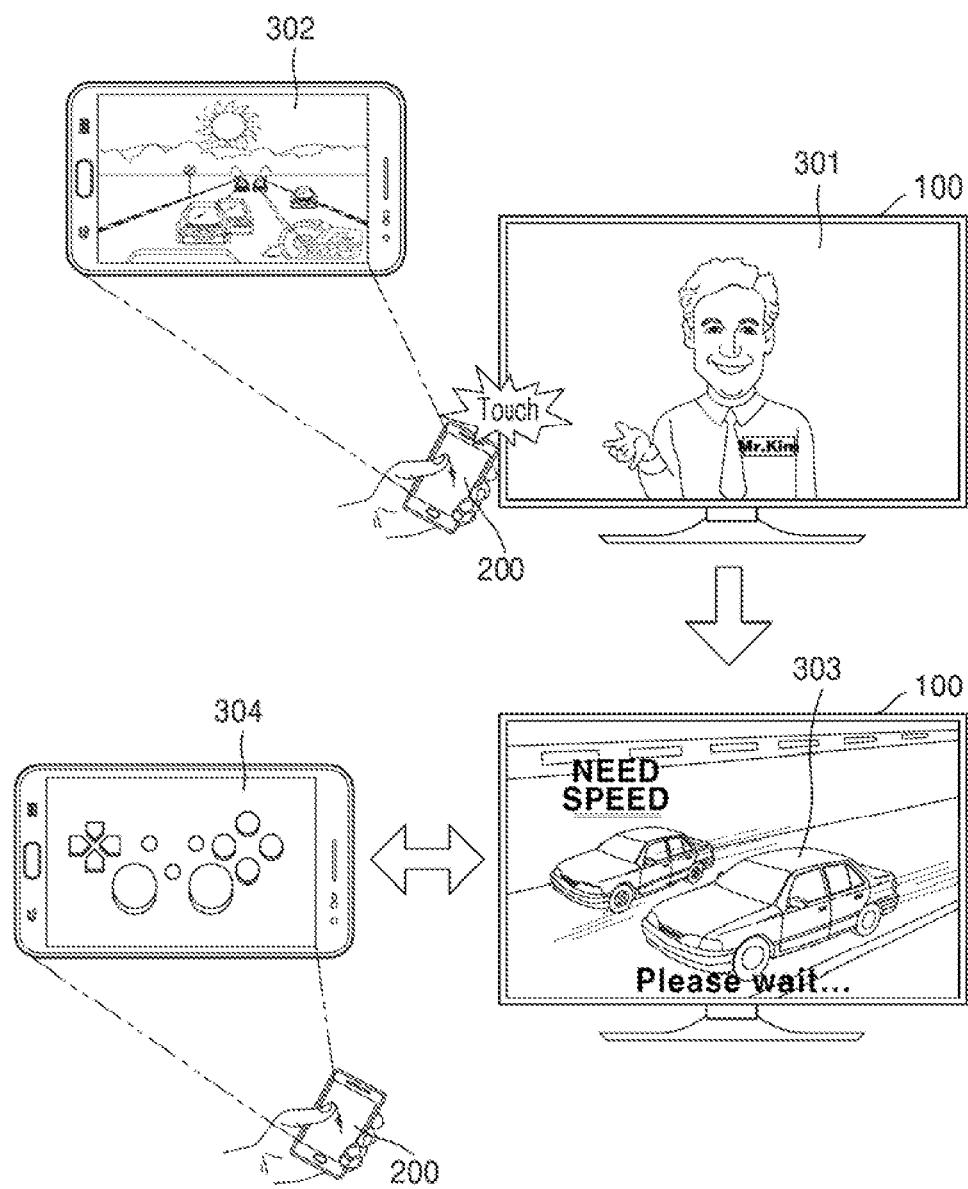
FIG. 3 is a diagram schematically illustrating an example of performing a function corresponding to a first touch area, according to an embodiment.

FIG. 3 is a diagram schematically illustrating an example of performing a function corresponding to a first touch area, according to an embodiment.

FIG. 3 illustrates an example in which the left bezel area of the display device 100 is touched by the mobile device 200.

In an embodiment, the display device 100 may be set to perform a function of executing an application identical to an application that is being executed in the mobile device 200 when touching of a left bezel area is sensed.

As illustrated in FIG. 3, while a game application is executed by the mobile device 200 (an execution screen 302) and the touching of the left bezel area of the display device 100 by the mobile device 200 is sensed, the display device 100 may execute a same game application that is being executed by the mobile device 200.

The display device 100 may display an application screen 303, e.g., mobile device application content related to the mobile device application, on the display 110 as the game application is executed the display device 100, instead of previously displayed screen 301. The mobile device 200 may display an operation screen 304 for game control when the game application is executed. Accordingly, the display device 100 may execute the game application while using the display 110 of the display device 100 and a display of the mobile device 200 as a multi-screen, e.g., the display 110 and a display of the mobile device 200 may form a multi-screen.

In an embodiment, the display device 100 may execute an application that is installed in advance therein and is the same as an application that is being executed in the mobile device 200, based on status information including information about the application. In an embodiment, the display device 100 may execute the same application by requesting an external server to provide the same application and receiving and installing the same application, based on the information about the application.

Figure 4:
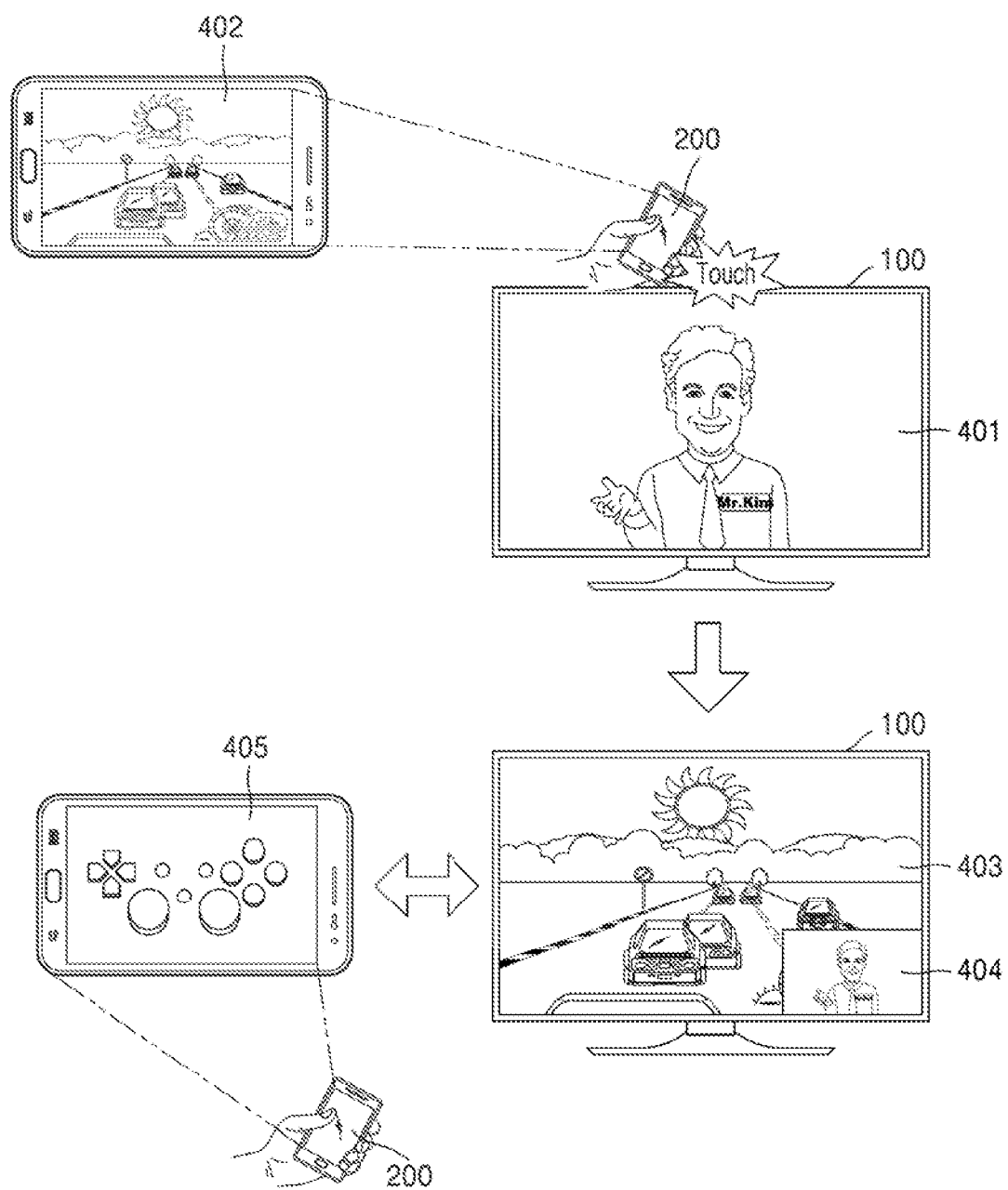
FIG. 4 is a diagram schematically illustrating an example of performing a function corresponding to a second touch area, according to an embodiment.

FIG. 4 is a diagram schematically illustrating an example of performing a function corresponding to a second touch area, according to an embodiment.

FIG. 4 illustrates an example in which the upper bezel area of the display device 100 is touched by the mobile device 200.

In an embodiment, the display device 100 may be set to perform a multi-screen function of displaying a screen, which is being displayed on the mobile device 200, as a multi-screen, as touching of the upper bezel area is sensed.

The multi-screen function is a function of displaying an execution screen, which is being displayed on one display, as a multi-screen on an area on another display, together with an execution screen displayed on the other display.

As illustrated in FIG. 4, the display device 100 may display an execution screen 402, which is being displayed on the mobile device 200, e.g., mobile device application content related to the mobile device application, on the display 110 (execution screen 403), when touching of the upper bezel area of the display device 100 by the mobile device 200 is sensed. In this case, the display device 100 may provide a multi-screen by displaying an execution screen 401, which is being displayed on the display device 100, on an area 404 of the display 110.

In addition, the mobile device 200 may display a control screen 405 for game operation when a game application is executed. Accordingly, the mobile device 200 may execute the game application by using the display 110 of the display device 100 and the display of the mobile device 200 as a multi-screen.

Figure 5:
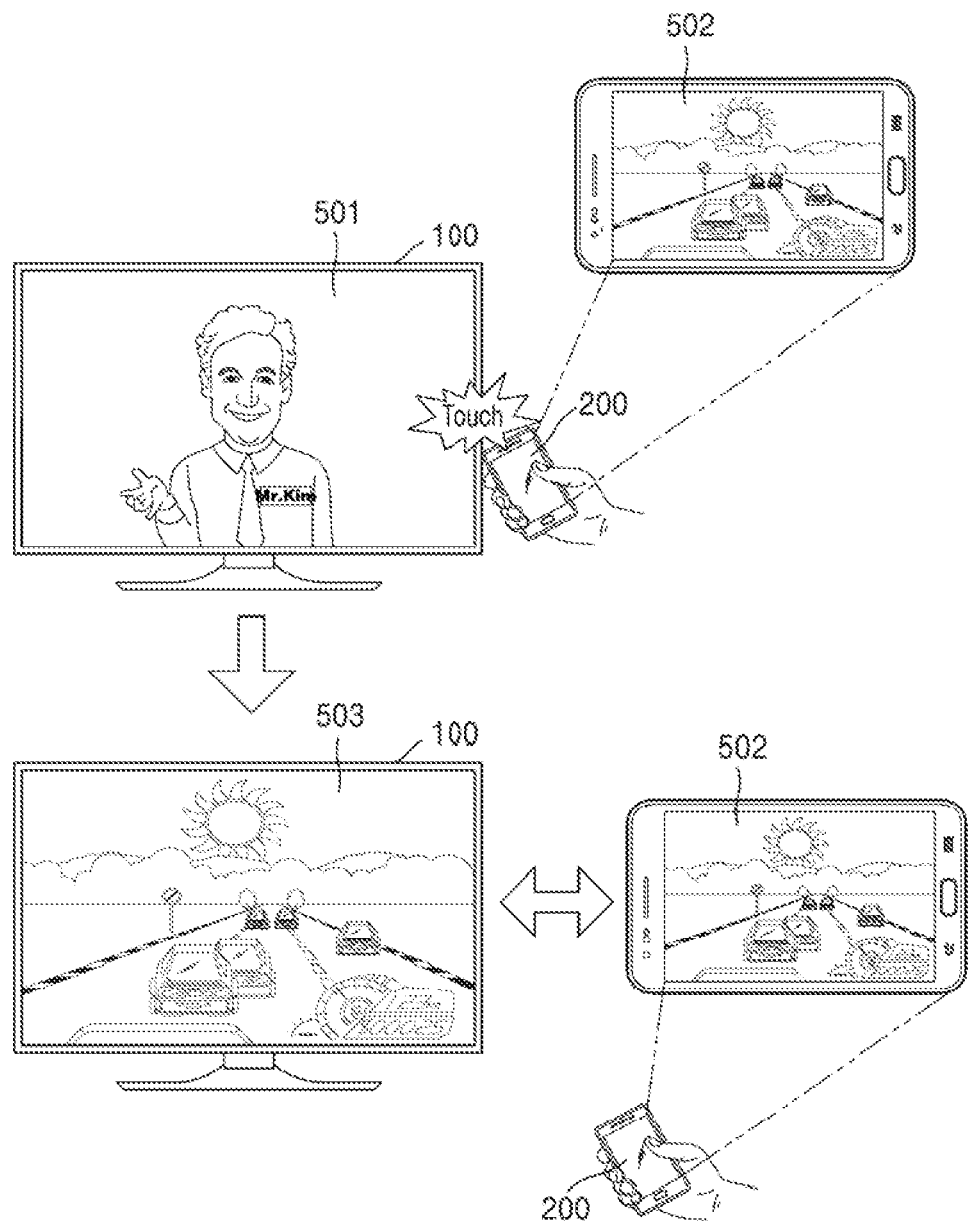
FIG. 5 is a diagram schematically illustrating an example of performing a function corresponding to a third touch area, according to an embodiment.

FIG. 5 is a diagram schematically illustrating an example of performing a function corresponding to a third touch area, according to an embodiment.

FIG. 5 illustrates an example in which the right bezel area of the display device 100 is touched by the mobile device 200.

In an embodiment, the display device 100 may be set to perform the screen mirroring function with respect to a screen being displayed on the mobile device 200 when touching of the right bezel area is sensed.

The screen mirroring function is a function of displaying an execution screen, which is being displayed on one display, on another display.

As illustrated in FIG. 5, as touching of the right bezel area of the display device 100 by the mobile device 200 is sensed, the display device 100 may display a game application execution screen 502, which is being displayed on the mobile device 200, on the display 110 of the display device 100 (execution screen 503). Accordingly, a screen 501 that was displayed on the display device 100 is no longer displayed on the display 110.

Figure 6:
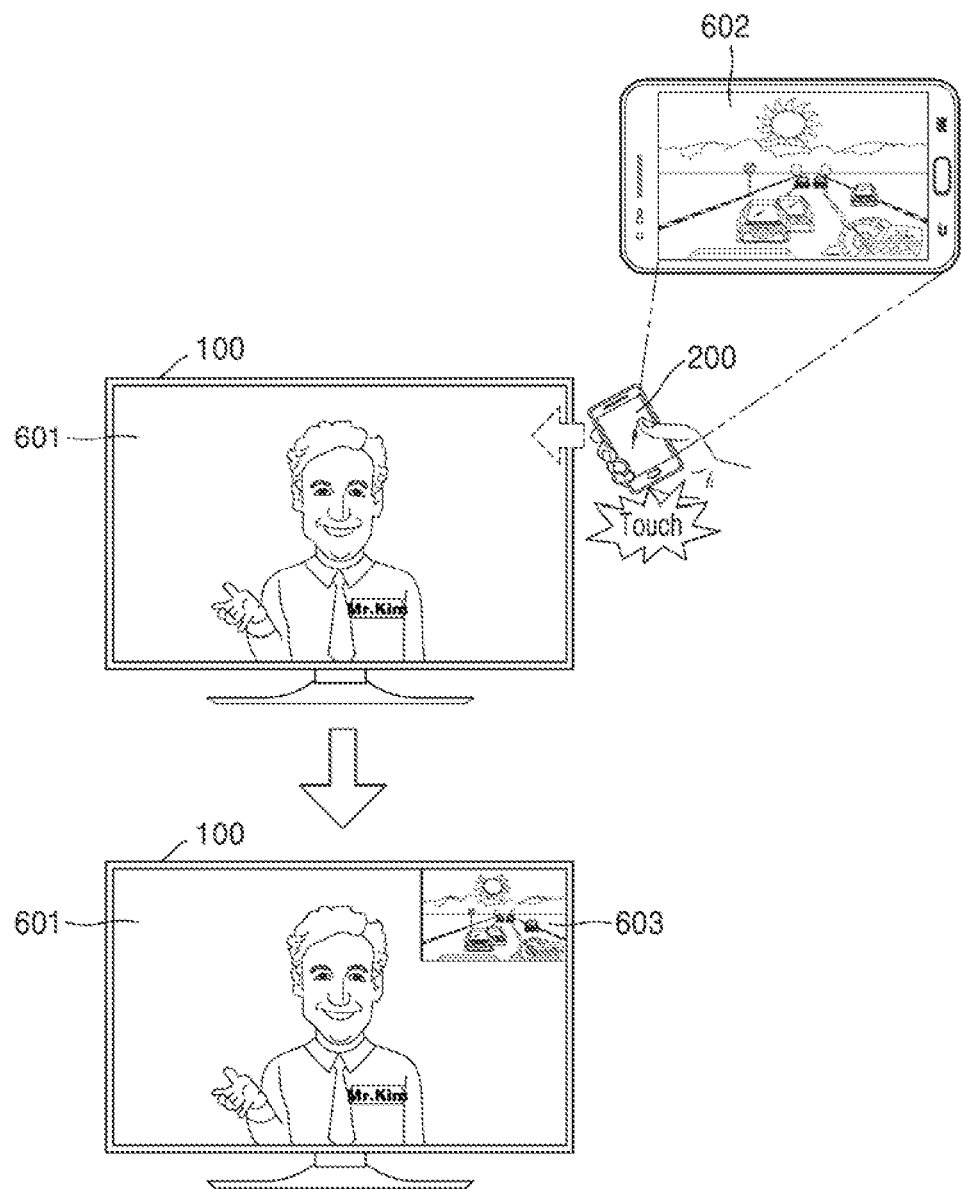
FIG. 6 is a diagram schematically illustrating an example of performing a function corresponding to a third touch area, according to an embodiment.
Figure 7:
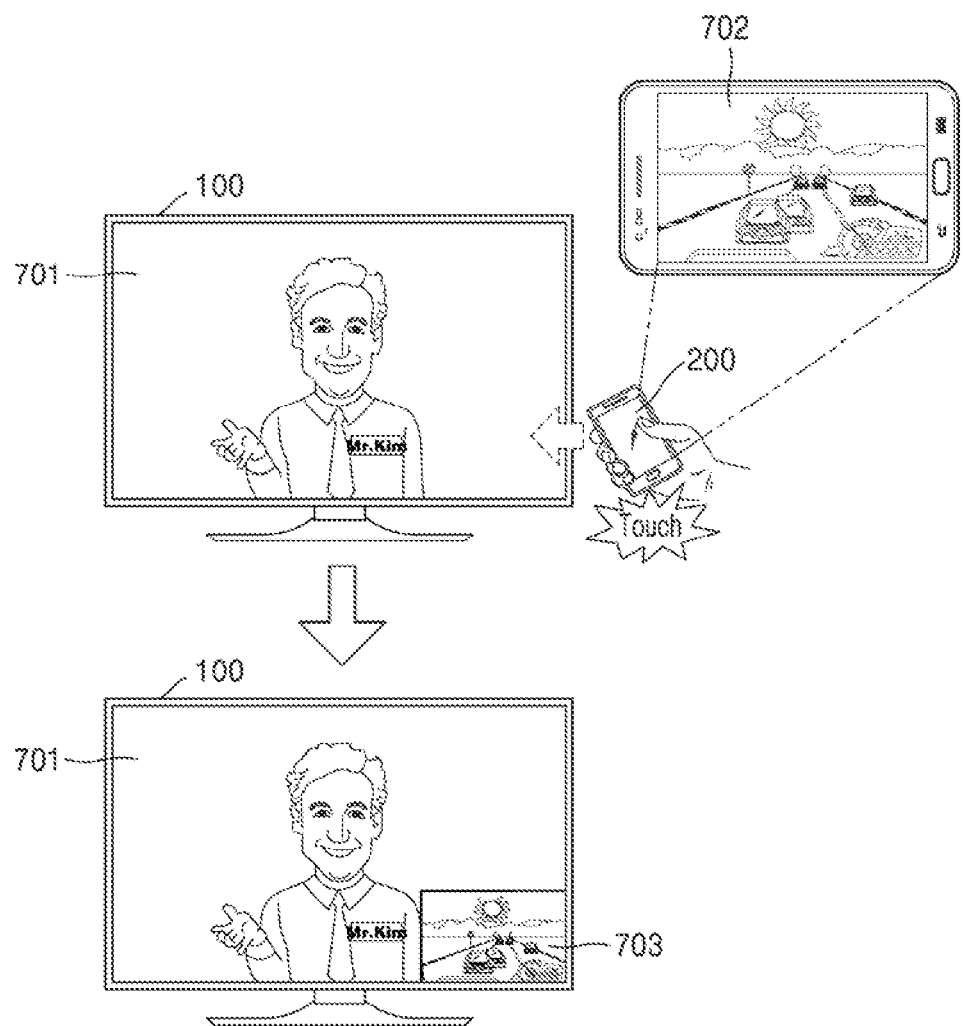
FIG. 7 is a diagram schematically illustrating an example of performing a function corresponding to a third touch area, according to an embodiment.

FIG. 6 is a diagram schematically illustrating an example of performing a function corresponding to a third touch area, according to an embodiment. FIG. 7 is a diagram schematically illustrating an example of performing a function corresponding to a third touch area, according to an embodiment.

In an embodiment, the display device 100 may be set to perform the screen mirroring function on a screen being displayed on the mobile device 200 and display the mirrored screen on an area on the display 110 of the display device 100, which is close to a touch area on the mobile device 200, as touching by the mobile device 200 is sensed.

FIG. 6 illustrates an example in which an upper region of the right bezel area of the display device 100 is touched by the mobile device 200.

As illustrated in FIG. 6, the display device 100 may display an execution screen 602, which is being displayed on the mobile device 200, on an area on the display 110 thereof close to a touch area on the mobile device 200 when touching of the upper region of the right bezel area of the display device 100 by the mobile device 200 is sensed.

For example, the display device 100 may display an execution screen 603, which is being displayed on the mobile device 200, in a picture-in-picture (PIP) format while continuously displaying a screen 601 displayed on the display device 100.

FIG. 7 illustrates an example in which a lower area of the right bezel area of the display device 100 is touched by the mobile device 200.

As illustrated in FIG. 7, the display device 100 may display an execution screen 702, which is being displayed on the mobile device 200, on an area on the display 110 thereof close to a touch area on the mobile device 200, when touching of a lower region of the right bezel area of the display device 100 by the mobile device 200 is sensed.

For example, the display device 100 may display an execution screen 703, which is being displayed on the mobile device 200, in the PIP format while continuously displaying a screen 701 displayed on the display device 100.

FIGS. 3 to 7 are examples only and embodiments are not limited thereto.

Figure 8:
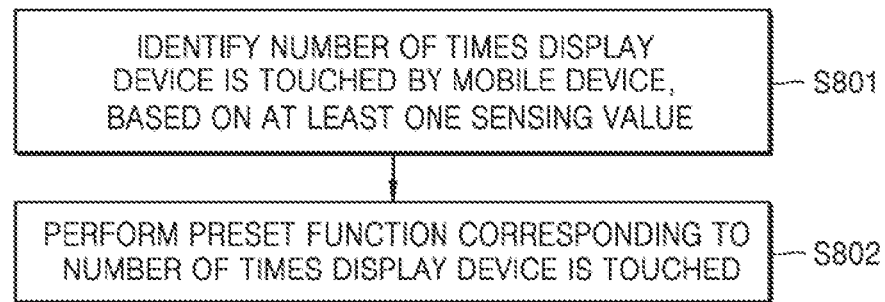
FIG. 8 is a flowchart illustrating an example of performing a function corresponding to the number of touches, according to an embodiment.
Figure 9A:
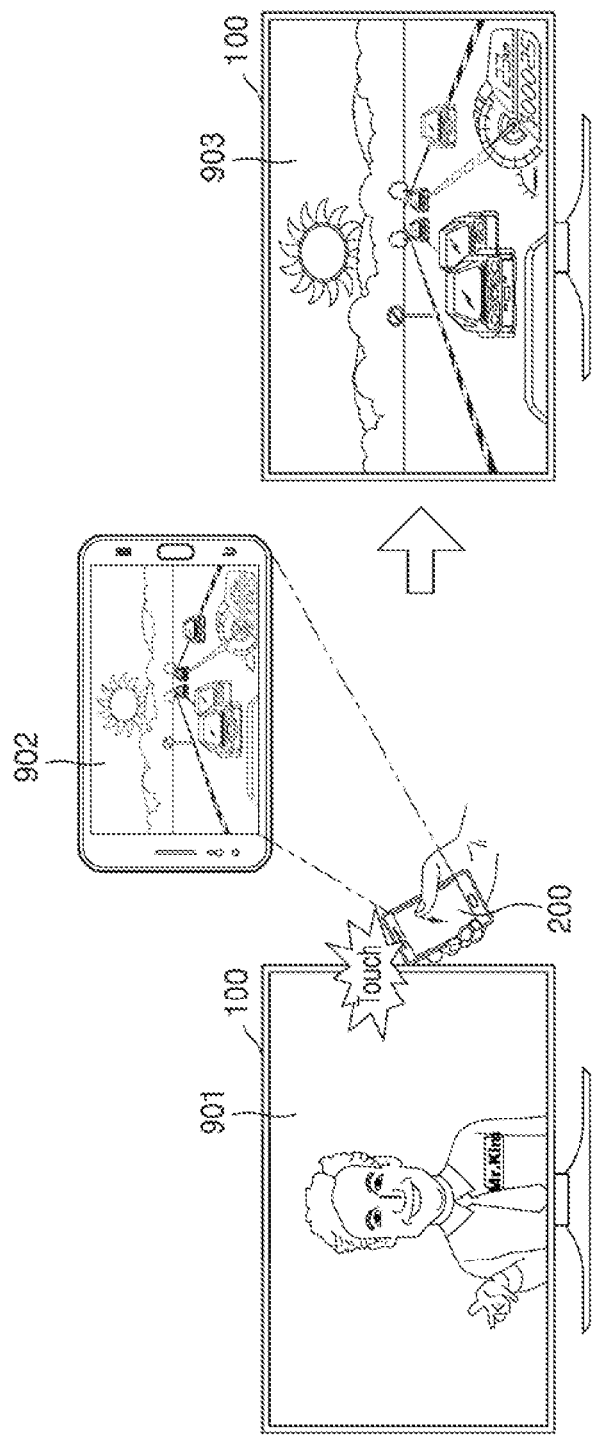
FIG. 9A is a diagram illustrating an example of performing a function corresponding to the number of touches, according to an embodiment.

FIG. 8 is a flowchart illustrating an example of performing a function corresponding to the number of touches, according to an embodiment. FIG. 9A is a diagram illustrating an example of performing a function corresponding to the number of touches, according to an embodiment. FIG. 9B is a diagram illustrating an example of performing a function corresponding to the number of touches, according to an embodiment.

In operation S801 of FIG. 8, the display device 100 according to an embodiment may identify the number of times the display device 100 is touched by the mobile device 200, based on at least one sensing value.

The display device 100 according to an embodiment may identify the number of times the display device 100 is touched, based on at least one sensing value sensed by at least one sensor of the sensing unit 191 mounted on the display device 100.

In an embodiment, the display device 100 may be set in advance to perform a predetermined function, e.g., a preset function, corresponding to the number of times the display device 100 is touched by the mobile device 200.

In operation S802 of FIG. 8, the display device 100 according to an embodiment may perform a preset function corresponding to the number of times the display device 100 is touched.

Referring to FIGS. 9A and 9B, for example, the display device 100 may be set to perform the screen mirroring function when the number of times the display device 100 is touched is one, and perform the multi-screen function when the number of times the display device 100 is touched is two or more.

FIG. 9A illustrates an example in which the display device 100 is touched once by the display device 100. The display device 100 according to an embodiment may perform the screen mirroring function when it is determined that the display device 100 is touched once by the mobile device 200. Accordingly, the display device 100 may display an execution screen 902, which is being displayed on the mobile device 200, on the display 110 of the display device 100 (execution screen 903), instead of displaying a screen 901.

FIG. 9B illustrates an example in which the display device 100 is touched by the mobile device 200 twice. In an embodiment, the display device 100 may perform the multi-screen function when it is determined that the display device 100 is touched by the mobile device 200 twice. Accordingly, the display device 100 may display an execution screen 906, which is being displayed on the mobile device 200, on the display 110 of the display device 100 (execution screen 907) and display a screen 905 displayed thereon on an area 908 on the display 110, thereby providing a multi-screen.

In an embodiment, the display device 100 may be set in advance to perform a predetermined function corresponding to the number of times the display device 100 is touched by the mobile device 200 and a touch area.

The display device 100 may identify a touch area and the number of times the display device 100 is touched, based on at least one sensing value, and perform the preset function corresponding to the touch area and the number of times the display device 100 is touched. For example, referring to FIG. 9A, the display device 100 may be set to perform the screen mirroring function, when the number of times the display device 100 is touched is one and the right bezel area of the display device 100 is a touch area. The display device 100 may identify that a touch area on the mobile device 200 is the right bezel area and the number of times the display device 100 is touched is one and perform the preset screen mirroring function.

FIGS. 8 to 9B are examples only and embodiments are not limited thereto.

Figure 10:
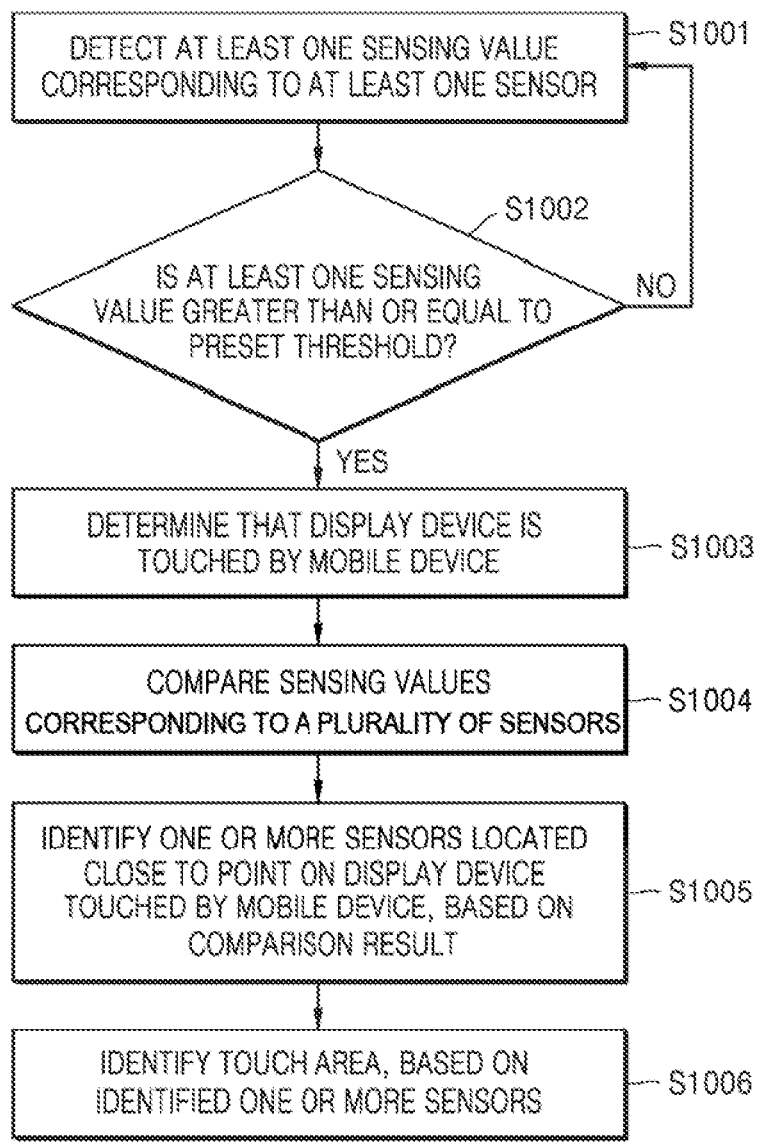
FIG. 10 is a flowchart illustrating an example of identifying a touch area, based on a sensing value, according to an embodiment.

FIG. 10 is a flowchart illustrating an example of determining a touch area, based on a sensing value, according to an embodiment.

In operation S1001 of FIG. 10, the display device 100 according to an embodiment may detect at least one sensing value corresponding to at least one sensor. Operation S1001 of FIG. 10 may correspond to operation S201 of FIG. 2.

In an embodiment, when the display device 100, e.g., a bezel of the display device 100, is touched by the mobile device 200, the display device 100 may obtain a sensing value by sensing an impact thereon by at least one sensor (e.g., an acceleration sensor 193).

In operation S1002 of FIG. 10, the display device 100 according to an embodiment may determine whether at least one sensing value detected by the sensing unit 191 is greater than or equal to a preset threshold.

In an embodiment, when a degree of a physical impact on the display device 100 is greater than or equal to the predetermined threshold, the display device 100 may determine that touching by the mobile device 200 is intentional.

In operation S1003, the display device 100 according to an embodiment may determine that the display device 100 is touched by the mobile device 200, because it is determined that the detected at least one sensing value is greater than or equal to the preset threshold. In this case, the display device 100 may transmit a pairing request signal (e.g., a BLE pairing signal). In addition, the display device 100 may receive a response signal from the mobile device 200.

For example, as it is determined that the display device 100 is touched by the mobile device 200, the display device 100 may be paired with the mobile device 200 through a Bluetooth communication connection. Alternatively, the display device 100 may be paired with the mobile device 200, for example, by a WFD communicator through a WFD communication connection but embodiments are not limited thereto.

In an embodiment, the mobile device 200 may receive the pairing request signal from the display device 100 and transmit a response signal in response to the pairing request signal. Alternatively, the mobile device 200 may be changed to a pairing mode (e.g., a BLE pairing mode) with the display device 100 and be paired with the display device 100.

In an embodiment, as the display device 100 is touched by the mobile device 200, the mobile device 200 may sense an impact thereon by using a sensing unit 291 included in the mobile device 200. An acceleration sensor included in the mobile device 200 may sense an impact caused when the display device 100 is touched by the mobile device 200. In addition, the acceleration sensor included in the mobile device 200 may detect a sensing value, e.g., a second sensing value, including a moving speed or acceleration of the mobile device 200.

In an embodiment, it is determined that when the second sensing value is greater than or equal to a preset threshold, the display device 100 is touched by the mobile device 200.

The mobile device 200 may enter the pairing mode when it is determined that the display device 100 is touched by the mobile device 200. In addition, the display device 100 may receive a pairing request signal (e.g., a BLE pairing signal) from the mobile device 200 and transmit a response signal to the mobile device 200.

The mobile device 200 may be paired with the display device 100 through a communication connection (e.g., a Bluetooth communication connection, a Wi-Fi Direct communication connection, or the like) but embodiments are not limited thereto.

In an embodiment, when a detected sensing value is smaller than a preset threshold, the display device 100 may wait for to determine whether an additional sensing value is detected without identifying a touch area. When the detected sensing value is smaller than the preset threshold, the display device 100 may determine that touching by the mobile device 200 is not intentional.

In an embodiment, the display device 100 may receive from the mobile device 200 a second sensing value sensed by the sensing unit 291 included in the mobile device 200. The display device 100 may determine whether the second sensing value is greater than or equal to a preset threshold.

In an embodiment, when it is determined that the second sensing value is greater than or equal to the preset threshold, the display device 100 may determine that the display device 100 is touched by the mobile device 200. When it is determined that the second sensing value is smaller than the preset threshold, the display device 100 may determine that touching of the display device 100 by the mobile device 200 is not intentional.

In an embodiment, the display device 100 may determine whether the display device 100 is touched by the mobile device 200 by comparing a result of at least one sensing value detected by the sensing unit 191 with a result of the second sensing value received from the mobile device 200. The display device 100 may determine that the display device 100 is touched by the mobile device 200 when it is determined that the at least one sensing value detected by the sensing unit 191 and the second sensing value received from the mobile device 200 are similar within a preset range.

In this case, the display device 100 may transmit a pairing request signal (e.g., a BLE pairing signal). In addition, the display device 100 may receive a response signal from the mobile device 200. The display device 100 may be paired with the mobile device 200 through a communication connection (e.g., a Bluetooth communication connection) but embodiments are not limited thereto.

In operation S1004 of FIG. 10, the display device 100 according to an embodiment may perform a comparison of at least one sensing value corresponding to at least one sensor and sensing values corresponding to other sensors included in the display device 100 with each other.

That is, when sensing values are detected by a plurality of sensors included in the display device 100, the display device 100 according to an embodiment may compare the sensing values corresponding to the plurality of sensors with each other, in operation S1004.

In operation S1005 of FIG. 10, the display device 100 according to an embodiment may identify one or more sensors located close to a point on the display device 100 touched by the mobile device 200, based on a result of the comparison.

The display device 100 according to an embodiment may determine that a sensor detecting a largest value among the plurality of sensing values is closest to the point on the display device 100 touched by the mobile device 200.

In operation S1006 of FIG. 10, the display device 100 according to an embodiment may identify a touch area, based on the identified one or more sensors.

For example, referring to FIG. 11A, when a sensor value obtained by a first sensor 1101 of FIG. 11A among sensor values obtained by a plurality of sensors is detected as a largest value, an area 1111 or an area 1113 among the bezel areas of the display device 100 may be identified as a touch area, based on a position of the first sensor 1101.

The display device 100 according to an embodiment may perform a preset function corresponding to the identified touch area. For example, as the area 1111 or the area 1113 of FIG. 11A is identified as a touch area, the preset function corresponding thereto may be performed.

FIG. 11A is a diagram illustrating an example in which at least one sensor is arranged on a display device and an example of a touch area, according to an embodiment.

FIG. 11A illustrates an example in which the first sensor 1101, a second sensor 1102, a third sensor 1103, and a fourth sensor 1104 are arranged close to the four corner areas of the display device 100.

In an embodiment, the display device 100 may identify at least one sensor having a relatively large value among sensing values detected by the first to fourth sensors 1101 to 1104, and determine an area close to a position of the identified at least one sensor.

For example, when the sensing values detected by the first sensor 1101 and the third sensor 1103 are largest values, the display device 100 may determine the areas 1113 and 1115 close to the positions of the first sensor 1101 and the third sensor 1103 as touch areas. The display device 100 according to an embodiment may perform a preset function corresponding to the areas 1113 and 1115.

For example, when the sensing values detected by the first sensor 1101 and the second sensor 1102 are largest values, the display device 100 may determine the areas 1113 and 1112 close to the positions of the first sensor 1101 and the second sensor 1102 as touch areas. The display device 100 according to an embodiment may perform a preset function corresponding to the areas 1113 and 1112.

Referring to FIG. 11A, for example, touch areas may be arranged as the areas 1111 to 1118 on the bezels of the display device 100.

In an embodiment, different certain functions may be set to correspond to the areas 1111 to 1118. Alternatively, the same function may be set to correspond to one or more touch areas, but embodiments are not limited thereto.

Figure 11B:
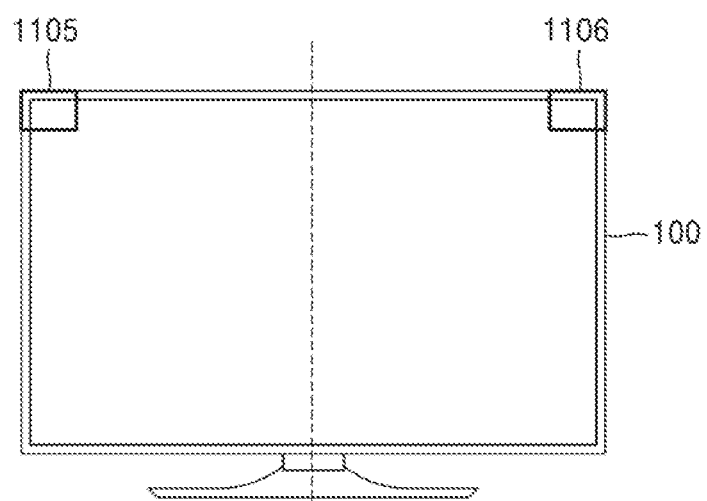
FIG. 11B is a diagram illustrating an example in which at least one sensor is arranged on a display device, according to an embodiment.

FIG. 11B is a diagram illustrating an example in which at least one sensor is arranged on a display device, according to an embodiment.

FIG. 11B illustrates an example in which a fifth sensor 1105 and a sixth sensor 1106 are arranged on the display device 100.

As illustrated in FIG. 11B, when two sensors, including the fifth sensor 1105 and the sixth sensor 1106, are arranged on the display device 100, the areas 1111, 1113, 1115, and 1117 of FIG. 11A may be set as touch areas to correspond to one certain function. Alternatively, the areas 1112, 1114, 1116, and 1118 of FIG. 11A may be touch areas corresponding to the sixth sensor 1106 and may be set to correspond to one certain function.

FIGS. 11A and 11B illustrate embodiments and thus the disclosure is not limited thereto. More or fewer sensors may be arranged on the display device 100. In addition, more or fewer touch areas may be set on the display device 100.

Figure 12:
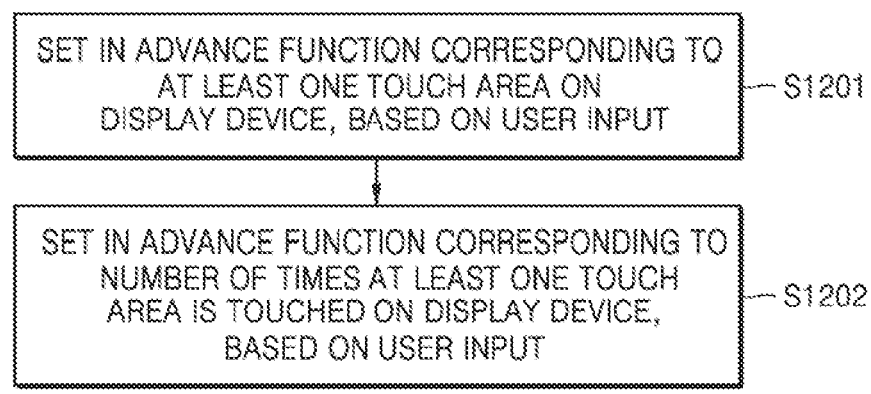
FIG. 12 is a flowchart illustrating an example of setting a function corresponding to a touch area in advance, by a display device, according to an embodiment.

FIG. 12 is a flowchart illustrating an example of setting a function corresponding to a touch area in advance by a display device, according to an embodiment.

In operation S1201 of FIG. 12, the display device 100 according to an embodiment may set in advance a function corresponding to at least one touch area on the display device 100, based on a user input.

The display device 100 according to an embodiment may provide a user interface to set a certain function related to the mobile device 200 to be performed by the display device 100 by touching the display device 100 by the mobile device 200.

For example, the display device 100 may present a plurality of touch areas (e.g., the areas 1111 to 1118 of FIG. 11A) which are settable, and provide on the display 110 a user interface to receive a user input to select at least one area.

Alternatively, for example, the display device 100 may present an example of a list of functions that are selectable to correspond to a selected touch area, and set a certain function to correspond to a selected area by receiving a user input to select the function from the list.

Alternatively, the display device 100 according to an embodiment may be set in advance to perform a certain function to correspond to a certain touch area, during the manufacture of the display device 100. The display device 100 may reset or change a touch area preset as a default and/or a certain function corresponding to the touch area, based on a user input.

In operation S1202 of FIG. 12, the display device 100 according to an embodiment may set in advance a function corresponding to the number of times at least one touch area is touched on the display device 100, based on a user input.

In an embodiment, the display device 100 may set a certain function to be performed to correspond to a certain number of times the display device 100 is touched.

For example, the display device 100 may provide an example of a list of configurable numbers of touches and provide the display 110 with a user interface to receive a user input to select a certain number of touches.

In an embodiment, the display device 100 may set a certain function to be performed when touching of a certain area of the display device 100 a certain number of touches is sensed.

For example, the display device 100 may present an example of a list of numbers of touches and touch areas which are settable, and provide on the display 110 a user interface to receive a user input to select a certain touch area and a certain number of touches.

FIG. 12 is provided to describe an embodiment and thus embodiments are not limited thereto.

Figure 13:
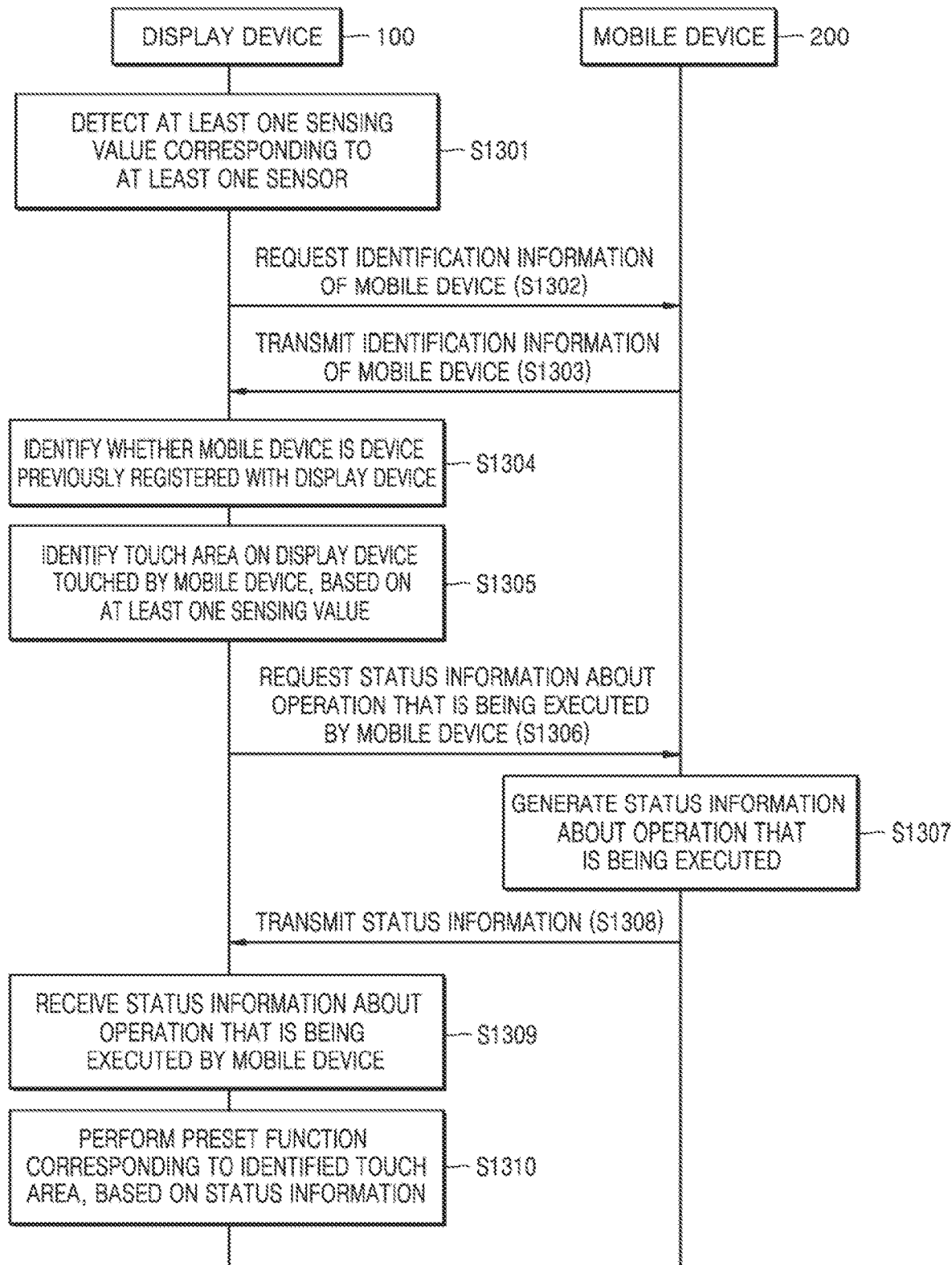
FIG. 13 is a flowchart of an operating method of a display device and a mobile device, according to an embodiment.

FIG. 13 is a flowchart of an operating method of a display device and a mobile device, according to an embodiment.

In operation S1301 of FIG. 10, the display device 100 according to an embodiment may detect at least one sensing value corresponding to at least one sensor. Operation S1301 of FIG. 13 may correspond to operation S201 of FIG. 2.

In an embodiment, when the display device 100 is touched by the mobile device 200, the display device 100 may detect a sensing value due to a physical impact by the sensing unit 191.

In operation S1302, the display device 100 may request identification information of the mobile device 200. The display device 100 according to an embodiment may transmit a request signal requesting the identification information of the mobile device 200 as the sensing value is detected.

In operation S1303, the mobile device 200 may transmit the identification information thereof. The mobile device 200 may transmit the identification information to the display device 100 in response to the request signal.

In operation S1304, the display device 100 may identify whether the mobile device 200 is a device previously registered with the display device 100. The display device 100 may identify whether the mobile device 200 is a previously registered device, based on the received identification information of the mobile device 200.

In operation S1305, the display device 100 may identify a touch area touched by the mobile device 200, based on the at least one sensing value detected in operations S1301. Operation S1305 of FIG. 13 may correspond to operation S202 of FIG. 2.

In operation S1306, the display device 100 may request status information about an operation that is being executed by the mobile device 200.

The display device 100 according to an embodiment may request the status information about the operation currently being executed by the mobile device 200 to perform a preset function corresponding to the touch area in relation to the mobile device 200.

In operation S1307, the mobile device 200 may generate status information about the operation that is being executed. For example, the status information may include information about an application that is being executed. In addition, the status information may include information about a screen that is being displayed.

For example, the information about the application may include, but is not limited to, at least one of the type of the application, download information of the application, or content information related to execution of the application.

In operation S1308, the mobile device 200 may transmit the status information. In an embodiment, the mobile device 200 may transmit the status information of the mobile device 200 to the display device 100 in response to a request signal.

In operation S1309, the display device 100 may receive the status information about the operation that is being executed by the mobile device 200. Operation S1309 of FIG. 13 may correspond to operation S203 of FIG. 2.

In operation S1310, the display device 100 may perform a preset function corresponding to the touch area identified in operation S1305, based on the status information of the mobile device 200. Operation S1310 of FIG. 13 may correspond to operation S204 of FIG. 2.

FIG. 13 is provided to describe an embodiment and thus embodiments are not limited thereto.

The above-described embodiments may be embodied as a computer executable program and implemented in a computer for execution of the program by using a computer-readable recording medium. The data structures used in the above-described embodiments may be recorded on a computer-readable recording medium through various means. Furthermore, the above-described embodiments may be implemented in the form of a recording medium storing instructions executable by a computer such as program modules executable by a computer. For example, methods implemented by a software module or algorithm may be stored in a computer-readable medium in the form of codes or program instructions readable and executable by a computer.

The computer-readable medium may be any recording medium accessible by a computer and may include a volatile storage medium, a non-volatile storage medium, a removable storage medium, and a non-removable storage medium. The computer-readable medium may include, but is not limited to, a magnetic storage medium, such as a ROM, a floppy disk, a hard disk, or the like) and an optical storage medium such as a CD-ROM, a DVD, or the like. Alternatively, the computer-readable medium may include a computer storage medium and a communication medium.

A plurality of computer-readable recording media may be distributed over network coupled computer systems, and data, e.g., program instructions and code, stored in the distributed computer-recording media may be executed by at least one computer.

The embodiments described herein are only non-limiting examples. For brevity of the specification, a description of existing electronic configurations, control systems, software, and other functional aspects of the systems may be omitted.

The above-described embodiments intended to provide examples and it will be understood by those of ordinary skill in the art that various modifications may be made without changing the technical spirit or essential features of the disclosure. Therefore, it should be understood that the embodiments described above are merely examples in all respects and not restrictive. For example, each component described as a single type may be implemented in a distributed manner, and similarly, components described as distributed may be implemented in a combined form.

All the examples or example terms, e.g., "etc.", set forth herein are for the purpose of describing embodiments in detail and are not limiting.

In addition, unless specified using expressions such as "essential" and "importantly", the components described herein might not be indispensable components to the implementation of embodiments.

While embodiments have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

Terms such as "unit", "module," and the like, when used herein, represent units for processing at least one function or operation, which may be implemented by hardware, software, or a combination of hardware and software.

"Units" and "modules" may be stored in an addressable storage medium and implemented by a program executable by a processor.

For example, "units" and "modules" may be implemented by components, such as software components, object-oriented software components, class components, and task components, processes, functions, attributes, procedures, subroutines, segments of program code, drivers, firmware, microcode, a circuit, data, database, data structures, tables, arrays, and parameters.

As used herein, a description "A may include one of a1, a2, and a3" should be broadly understood to mean that an example element that may be included in the element A is a1, a2, or a3.

It should not be understood from the above description that elements that may constitute the element A are limited to a1, a2, or a3. Therefore, it should not be understood that elements constituting the element A exclude other elements not mentioned herein, i.e., the above description should not be interpreted exclusively.

The above description may be understood to mean that A may include a1, a2, or a3. The above description should not be understood that elements constituting the element A are necessarily selectively determined within a certain set. For example, the above description should not be understood in a restrictive manner that a1, a2, or a3 selected from a set consisting of a1, a2, and a3 constitutes a component A.

What is claimed is:

1. A method for operating a display device, the method comprising:
    detecting at least one sensing value by at least one sensor of a plurality of sensors of the display device;
    identifying an exterior area touched by a mobile device among a plurality of exterior areas of the display device based on the at least one sensing value, each of the plurality of exterior areas being mapped to a corresponding function of a plurality of functions, the plurality of exterior areas comprising at least a first exterior area mapped to a first function among the plurality of functions and a second exterior area mapped to a second function among the plurality of functions; and
    performing a function among the plurality of functions based on the identified exterior area,
    wherein the performing of the function among the plurality of functions comprises:
    based on the identified exterior area being the first exterior area, performing, by the display device, the first function of executing an application executed by the mobile device at a time the display device is touched by the mobile device, and
    based on the identified exterior area being the second exterior area, performing, by the display device, the second function of displaying a screen displayed on the mobile device at the time the display device is touched by the mobile device.

2. The method of claim 1, further comprising:
    identifying a number of times the display device is touched by the mobile device, based on the at least one sensing value, and
    performing a preset function corresponding to the number of times the display device is touched, among a plurality of preset functions which are determined in advance in correspondence to a number of times the display device is touched by the mobile device.

3. The method of claim 1, further comprising:
    determining that the display device is touched by the mobile device based on determining that the at least one sensing value is equal to or greater than a first threshold;
    based on requesting identification information of the mobile device, receiving the identification information of the mobile device from the mobile device; and
    identifying whether the mobile device has been previously registered with the display device, based on the identification information.

4. The method of claim 1, wherein the identifying the exterior area comprises:
    identifying at least one sensor as a sensor among the plurality of sensors that is located closest to a point on the display device that is touched by the mobile device; and identifying the exterior area, based on a location of the at least one sensor at the display device.

5. The method of claim 1, wherein the corresponding function among the plurality of functions which are mapped to the plurality of exterior areas is preset based on a user input.

6. The method of claim 1, wherein the plurality of exterior areas of the display device are bezel areas of the display device.

7. The method of claim 1, further comprising:
based on the at least one sensing value being equal or greater than a threshold, transmitting a paring signal to the mobile device; and
receiving a response signal from the mobile device.

8. A display device comprising:
a display including a display area and a plurality of exterior areas, wherein each of the plurality of exterior areas is mapped to a corresponding function among a plurality of functions;
a communication circuit;
a sensing unit including a plurality of sensors;
a memory storing one or more instructions; and
a processor configured to execute the one or more instructions to:
detect at least one sensing value by at least one sensor of a plurality of sensors of the display device,
identify an exterior area touched by a mobile device among a plurality of exterior areas of the display device based on the at least one sensing value, each of the plurality of exterior areas being mapped to a corresponding function of a plurality of functions, the plurality of exterior areas comprising at least a first exterior area mapped to a first function among the plurality of functions and a second exterior area mapped to a second function among the plurality of functions, and
perform a function among the plurality of functions based on the identified exterior area,
wherein the processor is further configured to execute the one or more instructions to:
based on the identified exterior area being the first exterior area, perform the first function of executing an application executed by the mobile device at a time the display device is touched by the mobile device, and
based on the identified exterior area being the second exterior area, perform the second function of displaying a screen displayed on the mobile device at the time the display device is touched by the mobile device.

9. The display device of claim 8, wherein the processor is further configured to execute the one or more instructions to:
identify a number of times the display device is touched by the mobile device, based on the at least one sensing value, and
perform a preset function among a plurality of preset functions that corresponds to the number of times the display device is touched, the plurality of preset functions determined in advance in correspondence to a number of times the display device is touched by the mobile device.

10. The display device of claim 8, wherein the processor is further configured to execute the one or more instructions to:
determine that the display device is touched by the mobile device based on determining that the at least one sensing value is equal to or greater than a first threshold;
based on requesting identification information of the mobile device, receive the identification information of the mobile device from the mobile device; and
identify whether the mobile device has been previously registered with the display device, based on the identification information.

11. The display device of claim 8, wherein the processor is further configured to execute the one or more instructions to:
identify at least one sensor as a sensor among the plurality of sensors that is located closest to a point on the display device that is touched by the mobile device, and
identify the exterior area, based on a location of the at least one sensor.

12. The display device of claim 8, wherein the processor is further configured to execute the one or more instructions to set, in advance, the function corresponding to the exterior area, based on a user input.

13. The display device of claim 8, wherein the processor is further configured to execute the one or more instructions to set, in advance, a plurality of functions corresponding to a number of times the exterior area is touched, respectively, based on a user input, and the function is one of the plurality of functions corresponding to the number of times.

14. The display device of claim 8, wherein the plurality of exterior areas of the display are bezel areas of the display.

15. The display device of claim 8, wherein the processor is further configured to execute the one or more instructions to:
based on the at least one sensing value being equal or greater than a threshold, transmit a paring signal to the mobile device; and
receive a response signal from the mobile device.

16. A non-transitory computer-readable recording medium storing a program which, when executed by a computer, causes the computer to execute the method of claim 1.

* * * * *